US007997080B2

(12) United States Patent
Harmon, Sr. et al.

(10) Patent No.: US 7,997,080 B2
(45) Date of Patent: Aug. 16, 2011

(54) INTERNAL COMBUSTION ENGINE WITH AUXILIARY STEAM POWER RECOVERED FROM WASTE HEAT

(75) Inventors: James V. Harmon, Sr., Mahtomedi, MN (US); James V. Harmon, Jr., Minneapolis, MN (US); Stephen C. Harmon, Mahtomedi, MN (US)

(73) Assignee: Thermal Power Recovery LLC, Mahtomedi, MN (US)

( * ) Notice: Subject to any disclaimer, the term of this patent is extended or adjusted under 35 U.S.C. 154(b) by 737 days.

(21) Appl. No.: 12/075,042

(22) Filed: Mar. 7, 2008

(65) Prior Publication Data

US 2008/0216480 A1    Sep. 11, 2008

Related U.S. Application Data

(60) Provisional application No. 60/905,732, filed on Mar. 7, 2007.

(51) Int. Cl.
*F01K 23/06* (2006.01)
*F01K 23/10* (2006.01)
*F01K 27/00* (2006.01)
*F01K 13/00* (2006.01)
*F02G 3/00* (2006.01)

(52) U.S. Cl. ............... 60/670; 60/643; 60/676; 60/618; 60/616; 60/614

(58) Field of Classification Search .................. 60/618, 60/619–620, 712, 670, 671, 676, 678, 642–643, 60/650, 659, 688, 691–693, 698, 614, 616–617; 91/242, 245, 471; 123/50 R
See application file for complete search history.

(56) References Cited

U.S. PATENT DOCUMENTS 753,647 A    3/1904  Thorson
(Continued)

FOREIGN PATENT DOCUMENTS

GB           1750         0/1912
(Continued)

OTHER PUBLICATIONS

J.R. Allen and J.A. Bursley, *Heat Engines*, 1925 Third Edition, pp. 210 and 211, McGraw Hill, New York, U.S.
(Continued)

*Primary Examiner* — Thai Ba Trieu
(74) *Attorney, Agent, or Firm* — Nikolai & Mersereau, P.A.

(57) ABSTRACT

A combination internal combustion and steam engine includes a cylinder having a piston mounted for reciprocation therein with an internal combustion chamber and a steam chamber in the cylinder adjacent the piston and at least one steam exhaust port positioned to communicate with the steam chamber through the wall of the cylinder for exhausting steam at a location in the cylinder wall adjacent to an engine cylinder cap surface that is heated externally to assist in reducing chilling or condensation of steam entering the steam chamber from a boiler fired by waste combustion heat. The invention also permits steam admitted from a steam chest jacketing the cylinder cap to be exhausted from the engine when the steam chamber is in an expanded state whereupon residual steam is then recompressed prior to admitting the next charge of steam with the stream in the steam chamber being heated directly by the combustion chamber as well as by heat from the steam chest. An I.C. exhaust powered heater is a part of an I.C. exhaust manifold which functions as an afterburner with supplemental air injection for promoting combustion of unburned exhaust constituents to superheat steam that is piped through it to the steam chest. The invention provides valves for balancing steam engine displacement with boiler output and for cylinder compounding with a boiler, heat exchange and control arrangement for efficiently recovering waste heat.

43 Claims, 11 Drawing Sheets

U.S. PATENT DOCUMENTS

| | | | | |
|---|---|---|---|---|
| 0,845,622 | A | | 2/1907 | Du Shane ............... 60/618 |
| 863,545 | A | | 8/1907 | MacLachlan |
| 1,027,380 | A | | 5/1912 | Fryer |
| 1,169,672 | A | | 1/1916 | Palm |
| 1,324,183 | A | * | 12/1919 | Stall |
| 1,332,633 | A | * | 3/1920 | Parrish |
| 1,601,995 | A | * | 10/1920 | Butler et al. |
| 1,427,395 | A | * | 8/1922 | Koschtofsky |
| 1,489,291 | A | | 4/1924 | Tuerk ............... 123/193.1 |
| 1,496,839 | A | * | 6/1924 | Bohan et al. |
| 1,502,918 | A | | 7/1924 | Scott ............... 123/50 R |
| 1,517,372 | A | * | 12/1924 | Martineau |
| 1,542,578 | A | | 6/1925 | Pool ............... 123/50 R |
| 1,629,677 | A | * | 5/1927 | Bull |
| 1,630,841 | A | | 5/1927 | Fusch ............... 123/50 R |
| 1,732,011 | A | | 10/1929 | Gouirand ............... 123/66 |
| 1,732,911 | A | | 10/1929 | Ragan ............... 123/81 B |
| 2,063,970 | A | | 1/1930 | Young ............... 123/50 R |
| 1,802,828 | A | * | 4/1931 | Perrenoud |
| 1,913,251 | A | | 6/1933 | Smith ............... 123/50 R |
| 2,000,108 | A | | 5/1935 | Tucker ............... 123/50 R |
| 2,040,453 | A | | 5/1936 | Weber ............... 123/50 R |
| 2,057,075 | A | * | 10/1936 | Wuehr |
| 2,138,351 | A | | 11/1938 | McGonigall ............... 123/63 |
| 2,196,980 | A | * | 4/1940 | Campbell |
| 2,402,699 | A | * | 6/1946 | Williams |
| 2,943,608 | A | | 7/1960 | Williams |
| 3,200,798 | A | * | 8/1965 | Mansfield ............... 123/48 B |
| 3,248,870 | A | * | 5/1966 | Morgenroth ............... 60/522 |
| 3,650,295 | A | | 3/1972 | Smith |
| 3,908,686 | A | * | 9/1975 | Carter |
| 3,921,404 | A | * | 11/1975 | Mason |
| 4,023,537 | A | * | 5/1977 | Carter, Sr. et al. |
| 4,201,058 | A | | 5/1980 | Vaughan |
| 4,300,353 | A | * | 11/1981 | Ridgway |
| 4,362,132 | A | * | 12/1982 | Neuman ............... 123/73 D |
| 4,377,934 | A | | 3/1983 | Marshall |
| 4,509,464 | A | * | 4/1985 | Hansen |
| 4,590,766 | A | * | 5/1986 | Stribich |
| 4,706,462 | A | * | 11/1987 | Soltermack ............... 60/712 |
| 4,724,800 | A | | 2/1988 | Wood ............... 123/59.7 |
| 4,732,115 | A | * | 3/1988 | Lapeyre ............... 123/51 B |
| 4,785,631 | A | * | 11/1988 | Striebich |
| 5,121,607 | A | | 6/1992 | George, Jr. |
| 5,385,211 | A | | 1/1995 | Carroll |
| 5,934,076 | A | * | 8/1999 | Coney ............... 60/617 |
| 6,095,100 | A | * | 8/2000 | Hughes ............... 60/620 |
| 6,205,788 | B1 | * | 3/2001 | Warren ............... 60/643 |
| 6,834,503 | B2 | * | 12/2004 | Freymann |
| 6,895,756 | B2 | | 5/2005 | Schmotolocha |
| 6,986,252 | B2 | * | 1/2006 | Hedman ............... 60/712 |
| 7,104,063 | B2 | * | 9/2006 | Clemens |
| 2010/0300100 | A1 | * | 12/2010 | Harmon et al. ............... 60/645 |

FOREIGN PATENT DOCUMENTS

| | | |
|---|---|---|
| GB | 25356 | 0/1911 |
| GB | 28472 | 0/1913 |
| GB | 125 395 | 4/1919 |
| GB | 130 621 | 8/1919 |
| WO | WO 0231319 | 4/2002 |
| WO | WO 03050402 | 6/2003 |

OTHER PUBLICATIONS

Arias Theoretical Analysis of Waste Heat Recovery from an Int. Coml. Engine in a Hybrid Vehicle SAE Technical Paper Series 2006-01-1605 3 Pages 2006.

Muner: Developments in Automotive Power Plants SAE Paper 690043 Jan. 13-17, 1943 pp. 8+9.

Loving: Thermal Oxidizers. Steam Auto-Mobile Bulletin Sep.-Oct. 2006 pp. 28-30.

Kimmel: The Leslie Engine Steam-Auto-Mobile Bulletin Sep. Oct. 2007 pp. 14+14.

Cartland: Easy Starting Bash Valve Steam Auto. Class of America Tech Memo 120 Mar. 2, 1993.

An Assessment of the Technology of Rankine Engines for Automobiles Apr. 1977 Div. of Transportation Energy Conservation. US Energy Research + Development Administration pp. 22-24.

Heywood: Internal Combustion Engine Fundamentals. McGraw Hill 1988 pp. 657-659.

Marks: Standard Handbook for Mechanical Engines $9^{th}$ Ed McGraw Hill pp. 9-36 to 9-39.

Low: Heat Engines 1949 Longmains Green + Cr pp. 246-248.

Phenix: BMW's Hybrid Vision Popular Science Mag Mar. 2006 p. 22.

Jerry Peoples Gewgaws of Production Steam. *The Steam Automobile Bulletin*, Sep.-Oct. 2005, vol. 20 No. 5, pp. 7-13.

\* cited by examiner

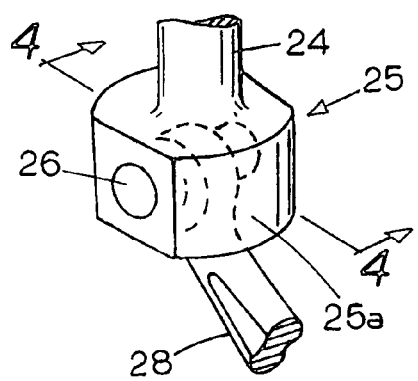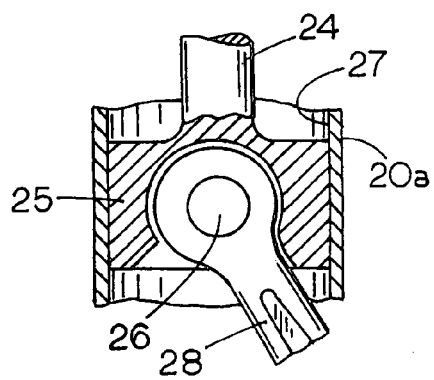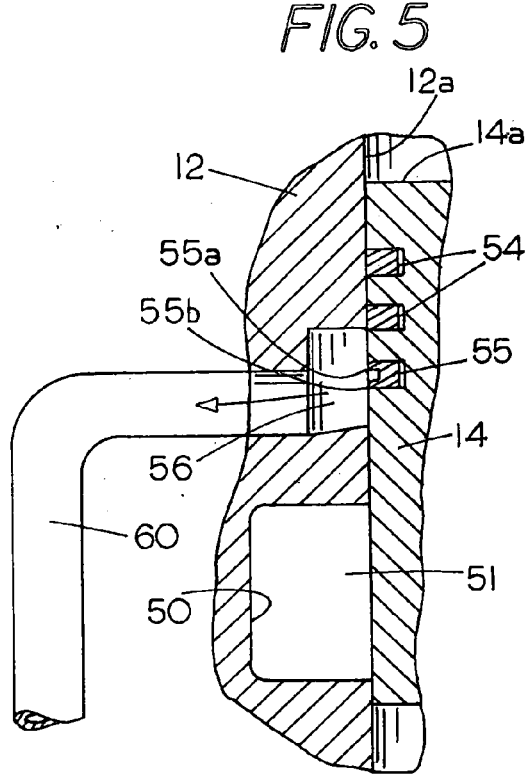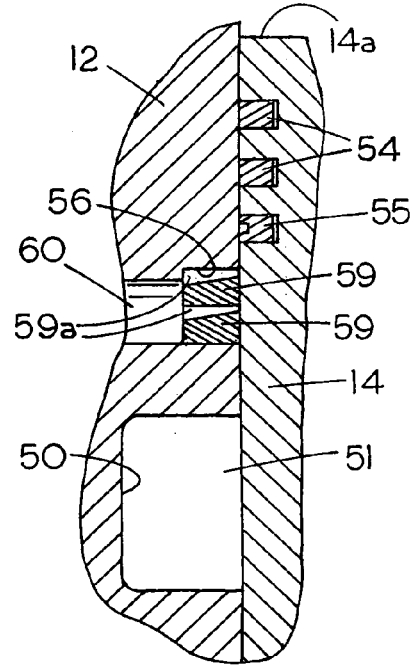

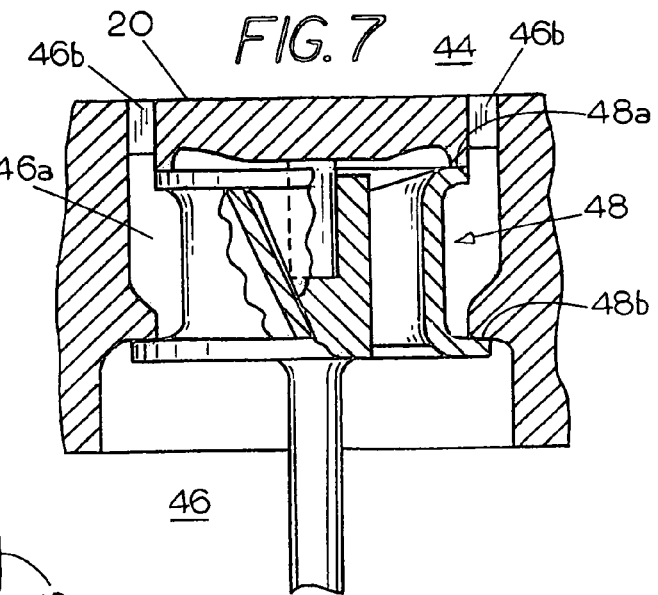
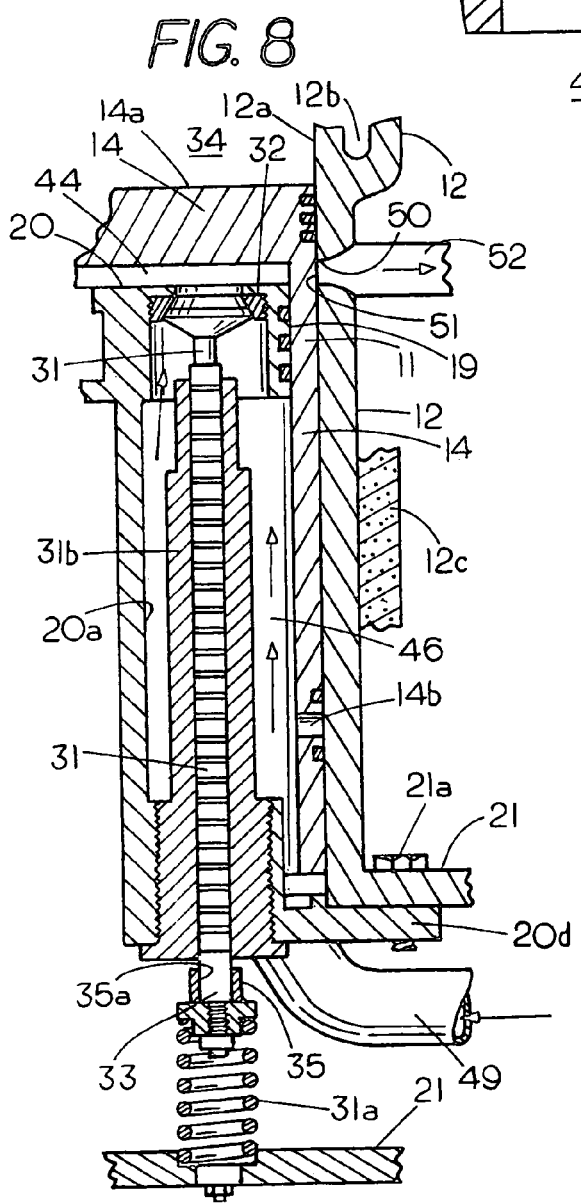

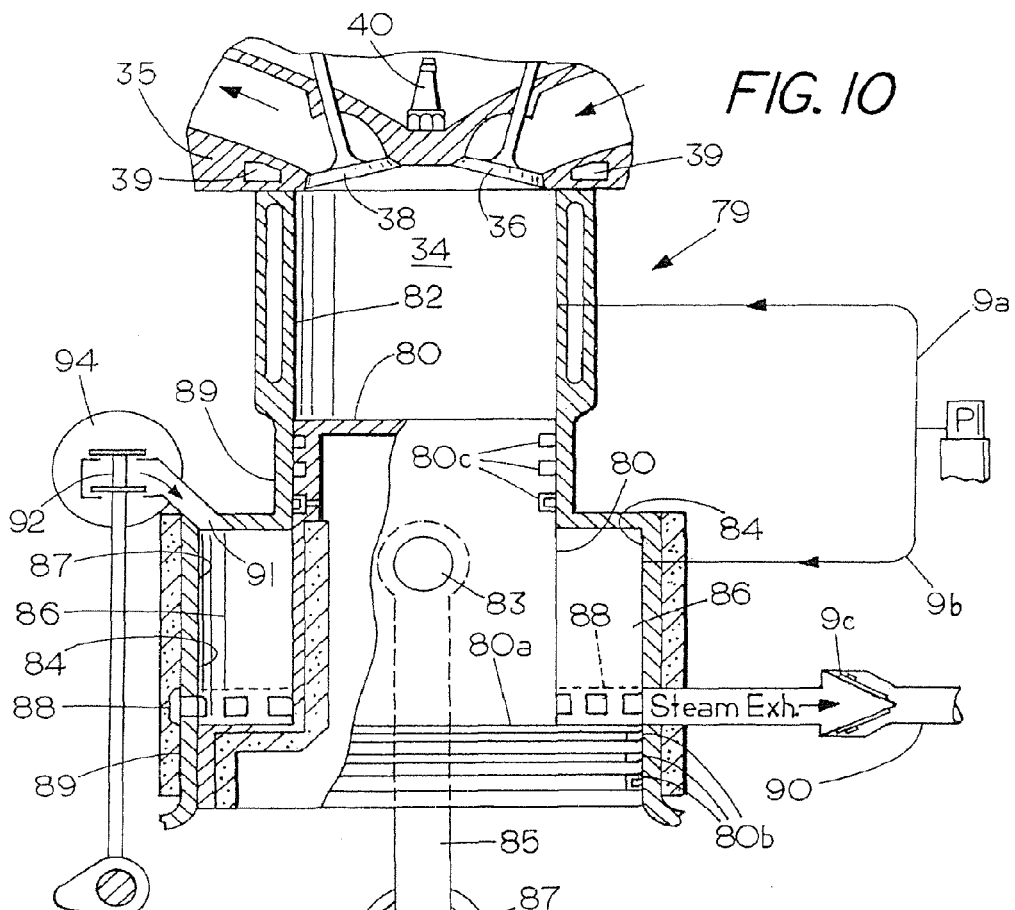
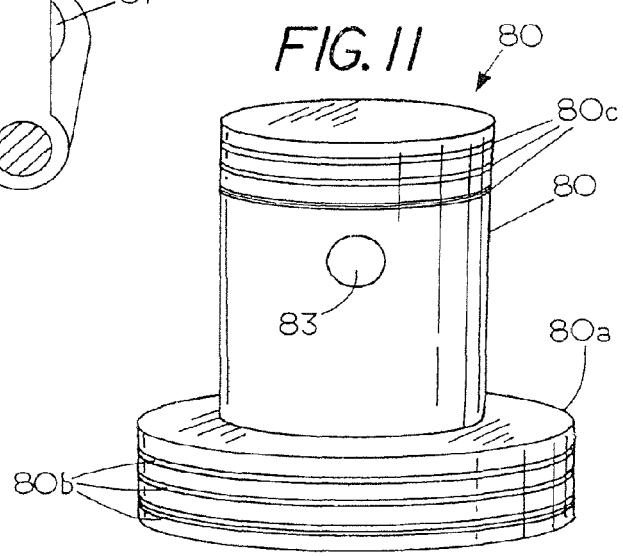

INTERNAL COMBUSTION ENGINE WITH AUXILIARY STEAM POWER RECOVERED FROM WASTE HEAT

Applicants claim the benefit of provisional application Ser. No. 60/905,732 filed Mar. 7, 2007 and bearing the same title which is incorporated herein by reference.

FIELD OF THE INVENTION

This invention relates to internal combustion engines with steam power obtained from waste combustion heat and to a combination internal combustion (I.C.) engine and steam engine.

BACKGROUND

Internal combustion engines although highly developed, dependable and relied upon for almost all road transportation throughout the world generally lose about 72-75% of the fuel heating value through radiation, engine coolant and exhaust. The measured brake horsepower of a typical six-cylinder spark ignition automobile was only 21% of the fuel heating value at 72 MPH and only 18% at 43 MPH, *Internal Combustion Engine Fundamentals*, J. B. Heywood, McGraw Hill 1988 pg. 675. Meanwhile, increasing fuel prices and shortages mount steadily as world supplies dwindle and air pollution problems continue. While there have been several attempts to provide greater efficiency in an internal combustion engine by recovering energy from waste heat, prior proposals have had marked shortcomings. One prior system developed by BMW International (U.S. Pat. No. 6,834,503) requires, in addition to the internal combustion engine, an entirely separate steam expander that is connected to the internal combustion engine by a belt to recover power from engine coolant and an exhaust powered boiler. This arrangement adds considerably to the size, weight and expense of the power plant as well as placing limitations on thermal recovery. Because of space constraints in a vehicle, the volume and weight of the complete unit is critical. Porsche AG developed a waste heat turbine that was geared to an I.C. engine (U.S. Pat. No. 4,590,766). The present invention aims to provide a way to recycle steam continuously in a closed circuit (no steam exhaust) through a high efficiency expander where economy of operation is the prime consideration while the same time improving I.C. emissions. Attempts have been made to combine a gas and steam engine for recovering waste engine heat, examples of which are the Still engine (GB Patent 25,356 of 1910 and 28,472 of 1912 and U.S. Pat. No. 1,324,183) and Mason U.S. Pat. No. 3,921,404. Still has a cylinder cover below the piston that provides a thin annular chamber which allows steam to flow in and out between the cover and the piston from an opening in the cylinder wall. In a counterflow engine, steam pressure throughout the entire cylinder falls close to atmospheric during the entire exhaust stroke producing a drop in steam temperature which cools cylinder walls allowing condensation of the steam admitted on the next power stroke. This robs the engine of power that would otherwise be available by reducing the mean effective cylinder pressure of the incoming charge of steam. However, the efficiency of steam engines operating on what is known as the uniflow principle achieve much greater efficiency than in a counterflow steam engine by reducing the condensation of steam. A double acting hollow piston uniflow engine in described in *Marks Standard handbook for Mechanical Engineers*, 1987 Section 9-37 but is unsuited for use as a combination internal combustion and steam car engine in part due to overheating of the piston. One object of the present invention is to provide a combined internal combustion and steam engine that overcomes thermal inefficiencies inherent in prior combination engines but has the advantage of utilizing I.C. components (piston, cylinder, connecting rod and crankshaft) and efficiency gains that result from sharing some of the I.C. mechanical losses as well as having a compact unobstructed combustion chamber without pockets or extensions as present in an F head (opposing valve) engine thereby permitting a high performance, high compression four I.C. valve hemispherical chamber construction. A more specific object is to provide a combination engine in which internal combustion and steam act on the same piston without steam condensing on the cylinder or piston walls or heads upon admission so as to eliminate condensation losses previously inherent in prior double acting combination engines. To accomplish this, the invention must provide inherent protection against chilling of steam chamber walls by low-pressure exhausted steam as good or better than in what as known as a uniflow engine. An important requirement in a double acting I.C. and steam engine is the need for a mechanism that uses the least possible added cylinder length to minimize engine size and weight. However, it is also necessary to prevent burnt I.C. gas/oil and blow-by gas from contaminating the steam and thereby reducing boiler and condenser efficiency. The invention aims to add as little as possible to the cylinder length to accommodate steam yet not contaminate the steam with oil or combustion products. Another general objective of the present invention is to provide a power source for more efficiently utilizing waste heat that is built into the internal combustion engine itself so that a separate steam engine or expander is unnecessary, making possible better recovery of waste energy from the internal combustion engine as well as a reduction in the over-all volume of the power unit and its production cost together with operating flexibility so that the engine is well adapted for powering vehicles especially cars, buses, trucks and locomotives. It is a more specific object of the present invention to obtain the outstanding efficiency advantages of the uniflow steam engine in a combined I.C. and steam engine that derives power from steam and combustion acting upon a piston yet is flexible enough to operate efficiently with large variations in load and boiler output. Yet another object is to more efficiently recover lost combustion heat by conductive transfer to a working fluid within the engine itself as well as a more efficient way of recovering waste heat from I.C. engine coolant and from engine exhaust gases. Another more specific object is to provide a way to capture and remove oil and blow-by gas before it can enter a steam line.

These and other more detailed and specific objects and advantages of the present invention will be better understood by reference to the following figures and detailed description which illustrate by way of example but a few of the various forms of the invention within the scope of the appended claims. Topic headings are for convenience of the reader and not intended to be in any way limiting.

BRIEF DESCRIPTION OF THE DRAWINGS

FIG. 3 is a perspective view of the crosshead and upper portion of the connecting rod.

FIG. 4 is a transverse vertical sectional view of the crosshead taken on line 4-4 of FIG. 3, also showing the crosshead guide column.

FIG. 5 is a greatly enlarged partial vertical sectional view showing a portion of the cylinder wall and piston at the bottom dead center position.

FIG. 5A is a view similar to FIG. 5 to illustrate additional oil rings.

FIG. 7 is a partial vertical cross sectional view of the steam cylinder head or cap on an enlarged scale to show the double seated balanced poppet valve.

FIG. 8 is a vertical sectional view showing another form of steam admission valve.

FIG. 10 is a vertical sectional view of a stepped piston engine in accordance with the invention.

FIG. 11 is a perspective view of the piston of FIG. 10.

SUMMARY OF THE INVENTION

Figure 1:
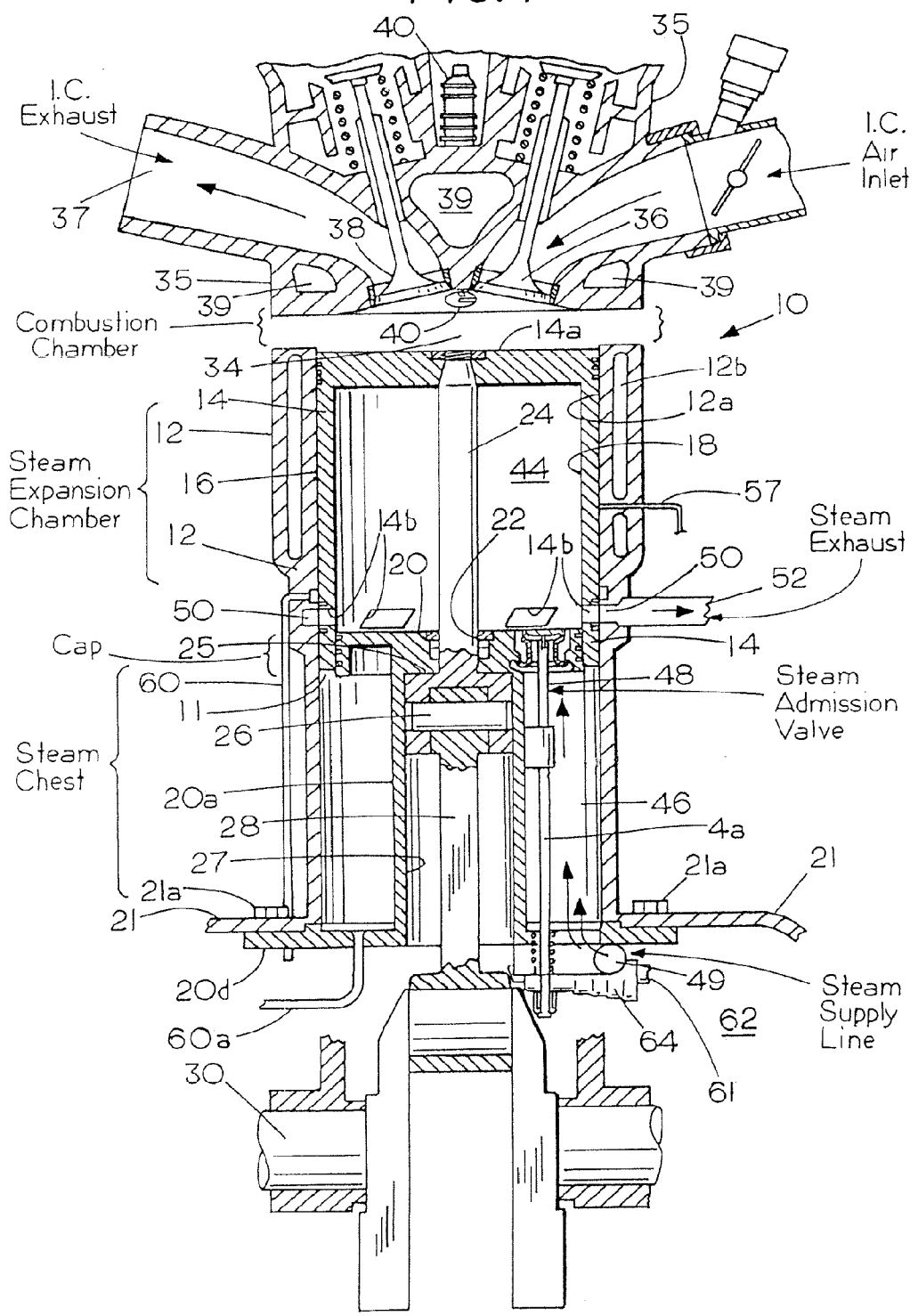
FIG. 1 is a semi-diagrammatic vertical sectional view of one cylinder of an engine in accordance with the invention with the combustion cylinder head elevated and rotated 90 degrees about a vertical axis to show the valves, the piston being shown at the top dead center position.

Briefly, one aspect of the invention concerns a composite internal combustion engine suited for use in a vehicle that includes an expandable combustion chamber for burning fuel to power a piston by combustion as well as an expandable chamber within the same engine that is powered by steam generated from what would have been waste combustion heat given off by the internal combustion engine. In the preferred embodiments to be described, there is a combustion chamber that can be hemispherical above each piston that acts on the upper surface of the piston and a steam expansion chamber within the cylinder adjacent the bottom portion of the piston and below the combustion chamber with a steam valving arrangement adjacent a heated engine surface that makes it possible to achieve high efficiencies which surpass what is known as the uniflow steam engine to provide additional power from waste combustion heat; an efficiency level much higher than in an ordinary counterflow steam engine as well as the flexibility needed under non-uniform boiler pressure and engine load conditions that occur in vehicles through a provision for variable steam displacement. Another aspect of the invention concerns a more efficient way of recovering combustion heat that is contained in the combustion engine coolant and in the I.C. exhaust gas using an exhaust powered boiler as well as by direct conduction of the heat produced in the combustion chamber to expanding steam within a steam chamber that is adjacent to the piston. Another aspect of the invention concerns an improved heat recovery, heat exchange, and boiler system for generating steam with a way to better construct a steam expansion chamber, steam cylinder head, heated steam exhaust area and steam supply arrangement that is able to act on a piston within an I.C. engine so as to more effectively economize on fuel, make a more efficient combined gas and steam engine, balance the steam displacement with the boiler output to use steam more efficiently and provide other features that will be apparent from the following description.

DETAILED DESCRIPTION OF THE PREFERRED EMBODIMENTS

Refer now to the drawings. Shown diagrammatically in FIGS. 1-8 is a combination internal combustion engine and steam engine 10 that has a cylinder 12 containing a cup shaped trunk style piston 14 which, unlike ordinary pistons, is machined and ground to precise tolerances both outside at 16 as well as in the inside at 18 and is positioned to reciprocate within an annular space 11 between the inside wall 12a of the cylinder 12 and a stationary steam cylinder head.

Figure 2:
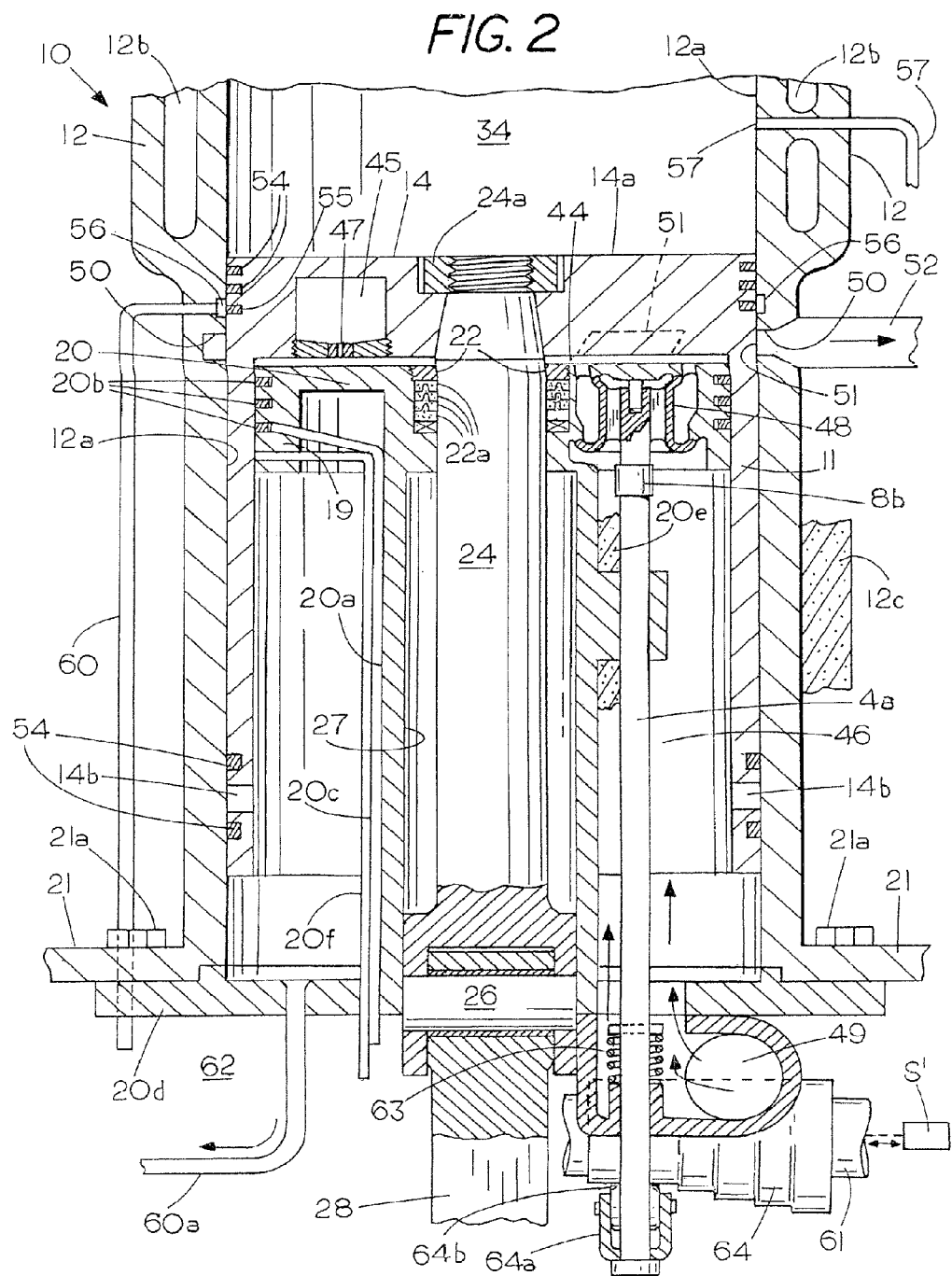
FIG. 2 is a partial view of the lower half of the cylinder of FIG. 1 on an enlarged scale showing the piston at the bottom dead center position.
Figure 6:
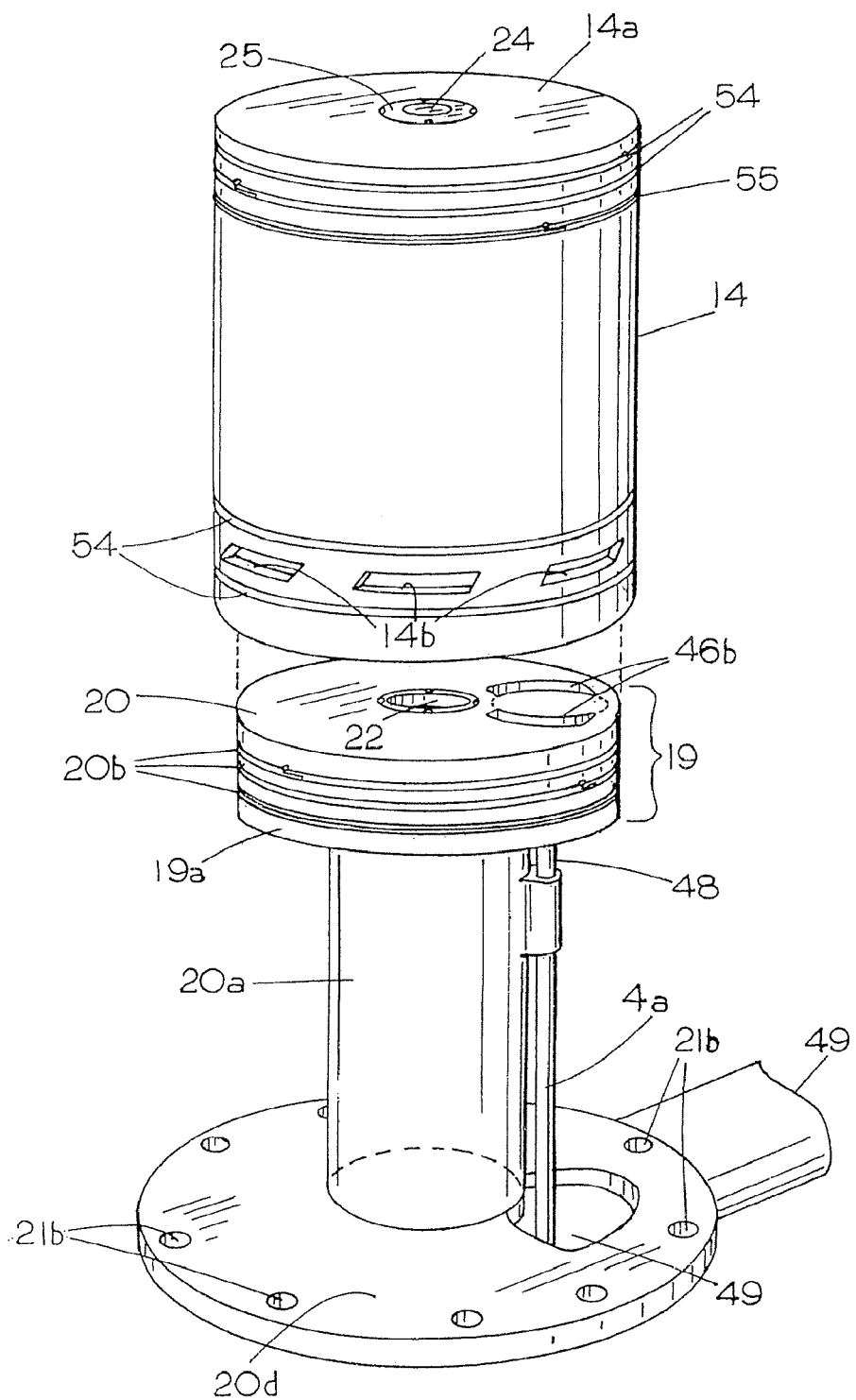
FIG. 6 is an exploded perspective view of the steam cylinder head or cap and piston.

The steam cylinder head which is located within the piston 14 comprises a flat hub, disk or circular cap 20 that may be, say, ¼ to ½ inch in thickness supported at the free upper end of an integral crosshead guide column 20a which is secured to the crankcase 21 by bolts 21a (FIGS. 1 and 2) that extend into openings 21b (FIG. 6) in base 20d shown at the lower end of column 20a in FIGS. 1, 2 and 6. The disk or cap 20 acts as a top or end cap for the guide column 20a as well as one end of a steam chamber 44 and has at its outer edge a cylindrical surface 19a as a part of a downwardly extending collar 19 that is dimensioned to provide a sliding fit within the piston 14 and is grooved to support compression rings 20b which provide a sliding seal with the inner cylindrical surface of the piston 14. It can be seen that the cap 20 traverses the cylinder 12 in a location that is spaced from its ends. Mounted within the cylinder cap 20 between the outer surface 19a and the center of the cap 20 is the steam inlet valve 48. The space between the column 20a and the cylinder 12 comprises a steam chest 46 containing high-pressure, high temperature steam at substantially throttle pressure which is admitted to the steam expansion chamber 44 below the piston 14 when valve 48 is opened, driving the piston 14 upwardly. Cylinder 12 can be independently bolted to the crankcase 62, if desired, to accommodate steam's thermal disparities rather than being cast en block as shown.

At the top of cap 20 is a bushing 22 suitably sealed with packing for a piston rod 24 which is secured to the piston by a nut 24a that can be notched for a spanner wrench. The piston rod slides through the bushing 22 and is secured to a connecting rod 28 for transmitting power to a crankshaft 30. At the lower end of the piston rod 24 is a piston style crosshead 25 with a partially cylindrical outer surface 25a (FIG. 3) that slides within an inner cylindrical bore 27 of the cap supporting column 20a which serves as a crosshead guide to take up the side thrust of the connecting rod 28. Consequently, piston slap common to most I.C. engines is eliminated. The crosshead is coupled to the connecting rod by a wrist pin 26. The alloys used in the piston 14 and cap 20, are selected to provide a predetermined balanced amount of expansion during startup. When an aluminum piston is used, the interior wall 18 can be electroplated with porous chromium by a well-known method or covered by a steel sleeve (not shown) to provide a hard piston ring contact surface. The steel sleeve can be spaced slightly from the aluminum piston skirt in most places to reduce heat loss from steam within the piston. In operation, the skirt of the piston 14 reciprocates in the annular space 11 between the cylinder wall 12 and the cap 20 as steam is admitted into the steam expansion chamber 44 below the piston from the steam chest 46 through the admission valve 48 to raise the piston.

A conventional internal combustion chamber 34 above the upper face 14a of the piston 14 is enclosed at the top of the cylinder by a cylinder head 35 (shown 90° out of rotational alignment with the cylinder so that the valves can be seen) which has an inlet valve 36, an exhaust valve 38 and port 37, chambers 39 for coolant circulation, and a spark plug 40 operating as a four stroke (Otto) cycle I.C. engine that burns gasoline or other fuel in the combustion chamber 34 but which can be a diesel engine or a two stroke cycle engine, if desired. The combustion chamber 34 is cooled by a coolant at 39 circulated through a waterjacket 12b of the cylinder 12 is compact, unobstructed, has no side pockets and, if desired, can even be of high performance, high compression, four overhead I.C. valve hemispherical construction to avoid detonation.

Within the wall of the cylinder 12 and extending around it nearly in alignment but slightly above the top of cap 20 is a steam exhaust manifold 50 which communicates with the interior of the cylinder 12 through spaced steam exhaust ports 51. It can be seen in FIG. 2 that the steam inlet valve 48 and steam exhaust ports 51 are located in approximate lateral alignment but the exhaust ports are at a slightly higher elevation. In operation, exhaust gas expelled through the exhaust port 37 of the I.C. engine passes through a boiler to be described below which recovers waste heat by boiling water or other heat transfer liquid to form steam that is admitted into the steam expansion chamber 44 below the piston from the steam chest 46 through an inlet passage 46a, 46b. Exhaust steam escapes through the steam exhaust manifold 50 to low-pressure steam return line 52 when the piston reaches the top dead center position as exhaust openings 14b in the piston skirt become aligned (FIG. 1) with ports 51 to act as an automatic exhaust valve, thus, in effect, providing a self-contained steam engine below each piston 14 of the I.C. engine. It will be noted that the automatic exhaust valve opens and closes while the steam chamber 44 is in an expanded state. Exhaust steam is condensed, then reheated and continuously recirculated back to the steam expansion chamber 44 in a sealed circuit that is separate from the I.C. engine intake and exhaust gas thus seldom requiring replacement.

It will be noticed that the cap 20 serves as the lower (steam) cylinder head for the steam expansion chamber 44, seals the chamber, provides support for the steam inlet valve 48 and establishes the clearance volume of steam chamber 44 which is purposely kept small to insure efficient operation (see FIG. 2 which shows the piston at the bottom dead center position). By this arrangement, the entire lower end of the steam expansion chamber 44 is steam jacketed including the steam inlet valve 48 and the top surface of the cap 20 which are therefore kept close to the elevated temperature of the steam chest 46 e.g. 1000 P.S.I. @850° F. thereby preventing loss of power due to steam condensation on those parts within chamber 44. It will be noted that the exhaust ports 51 unlike uniflow ports are located on the cylinder wall adjacent to a heated engine surface, namely, the cylinder cap 20, all of which except around piston rod 24, is heated externally throughout operation by the steam chest 46. Low-pressure steam is exhausted through line 52 when chamber 44 is over 50% and preferably over 75% expanded to its full volume. As illustrated, the exhaust will begin to open when chamber 44 is about 89% fully expanded.

The construction shown in FIGS. 1-8 produces a marked improvement in operating efficiency compared to a conventional counterflow engine. For example, assuming a 800 p.s.i. throttle pressure and a 10% cut off, the uniflow steam rate of the engine described and shown in FIGS. 1-8 is calculated to be 8.2 lb./HP-Hr, while in an equivalent counterflow engine the steam rate is calculated to be 11 lb./HP-Hr so that the invention is able to make possible a 25% improvement. At a 12.5% cut off, the engine of FIGS. 1-8 is calculated to have a steam rate of 8.3 lb./HP-Hr. vs. 10.4 for a conventional counterflow engine (a 20% improvement). Because the down stroke brings residual steam up to the admission temperature, condensation of incoming steam by residual steam is avoided as it is in a uniflow engine. Efficiency, however, is better than a uniflow engine because unlike the uniflow engine, where the piston surface adjacent the exhaust valve cannot be heated, here the entire adjacent cap 20 (FIG. 1) above high-pressure steam chest 46 is externally steam jacketed and thus heated continuously by the steam chest 46 so as to prevent chilling the incoming charge of steam. It is of salient importance that the invention enables low-pressure steam exhausted through line 52 to be kept away from the heated area below cap 20. To reduce heat loss, the wall of the guide 20a can be made of two concentric tubes with a dead air space between them.

Figure 15:
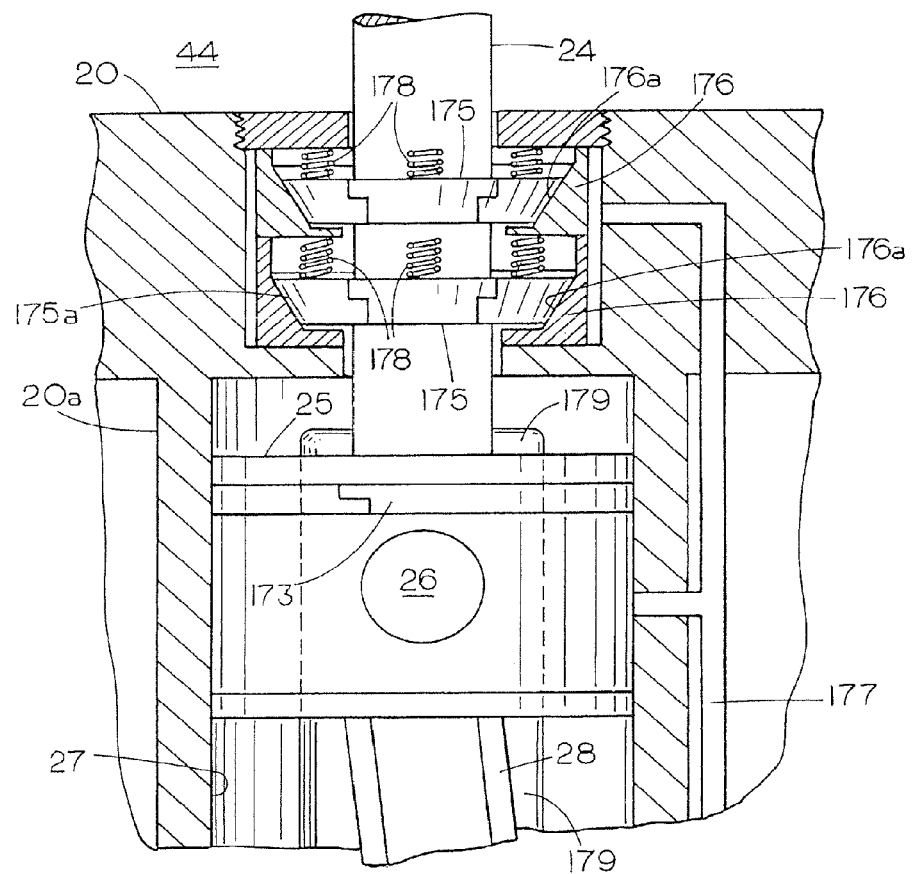
FIG. 15 is a partial vertical sectional view of the center of the cap showing the piston rod packing and crosshead.
Figure 16:
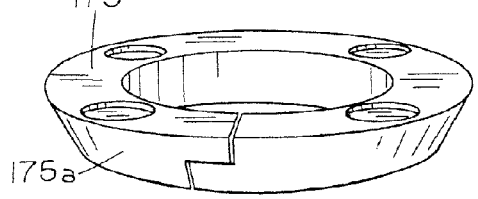
FIG. 16 is a perspective view of one form of metallic packing.
Figure 17:
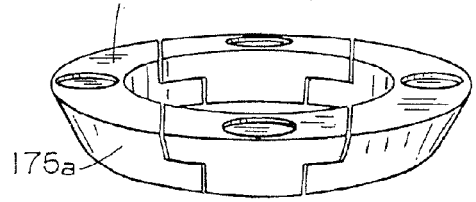
FIG. 17 is a perspective view of another form of metallic packing.

In the past, fiber shaft packing shown at 22a in FIG. 2 of the kind commonly used in steam powered vehicles had to be replaced at regular intervals and became scorched if high temperature steam was used. To avoid these problems, to prevent condensed steam from seeping into the crankcase and provide long life, an alternative metallic packing 175 can be used, if desired, with superheated steam as shown in FIGS. 15-17. Packing 175 is composed of a soft alloy such as babbitt or other metal alloy used in marine steam engine packing which needs replacement no more often than the piston rings and bearings etc. Each metallic shaft packing ring 175 is provided with sloped outer walls 175a resting on a similarly inclined seat 176a provided within one of two or more stacked bronze rings 176 that open upwardly toward the steam expansion chamber 44. The shaft packing rings 175 can be split for example into four pieces as shown in FIG. 17 or, if desired, can have a single lap joint as shown in FIG. 16. Each packing ring 176 is pressed onto its seat for example by means of compression springs 178 that are mounted in pockets on the top of each ring 175. The slope of the seat 176a is chosen so that the packing will not become too tight causing excessive power to be lost in friction. In operation, the packing rings 175 are able to rise slightly off their seats against the force of the springs. Optionally, the inner cylindrical bore 27 of guide 20a has two opposing air transfer channels e.g. longitudinal recesses 179 facing the wrist pin to permit free air flow around the crosshead except at the extreme upper end of the guide 20a. The metallic packing rings 175 are therefore able to cooperate with the adjacent cylindrical piston type crosshead 25 provided in the example shown in FIG. 15 with an optional piston ring 173 for returning any gas in vapor or liquid back through the packing to the steam expansion chamber 44 when pressure builds up below the packing as the crosshead 25 approaches the top dead center position above recesses 179 to thereby prevent seepage into the crankcase. The packing 175 and 176 shown in the figures can be supplemented, if desired, with an additional ring of fiber packing (not shown). Lubrication is supplied to the packing 175 and to the crosshead 25 through an oil line 177. Alternatively, if desired, a more conventional crosshead (FIG. 3) can be used with flat sides to permit the flow of air around it. To eliminate any potential steam condensation in the crankcase 62, the steam exhaust line 52 can be placed in contact with it for heating the oil in the sump enough to drive off moisture.

Steam Valve Structure

It is essential that the steam engine assembly be constructed in a way that will enable it to operate at relatively high r.p.m.s since a gas engine needs to operate with a piston speed around 3,000 feet per minute. The valves must therefore have a low mass and be free from a tendency to float at high r.p.m.s. While any suitable steam valve can be used, one form of balanced poppet valve 48 is shown diagrammatically by way of example in FIG. 7. The valve 48 is a balanced double seated poppet valve having upper and lower valve faces 48a and 48b each resting on its own seat at the top and bottom of chamber 46a within the cap 20. Chamber 44 communicates through chamber 46a and ports 46b with the steam chest 46 when valve 48 is opened. Resistance to movement that would otherwise exist due to high steam pressure is balanced by lower valve face 48b which is slightly larger than 48a resulting in a small upward force from steam that is easily overcome by the cam 64 (FIG. 2). During operation, when the cam 64 lowers the valve 48, steam will flow from steam chest 46 into the steam expansion chamber 44 below the piston 14 through the valve chamber 46a and ports 46b driving the piston upwardly. If the lower valve face 48b has an o.d. of ¾ inches, its spindle diameter is ⅛ inch, the i.d. of the upper valve 48a is 9/16 inches and the pressure is 750 lb/in.² then the net upward pressure on the valve would be about 130 lbs. plus the spring force. The closing force can be further offset, if desired, by a balancing plunger (not shown) at the lower end of the valve stem. Assuming the difference between the i.d. of the lower seat and the o.d. of the upper seat is 1/64 inch, the resulting downward (opening) force would be 12.4 lb. when the pressure in 44 builds to 750 p.s.i. and 16.5 lb. at 1000 p.s.i. The valve heads can be rotatably mounted on their stems if desired to equalize wear with pitched radial blades as shown in FIG. 7 to impart rotation. To better enable the valve 48 to rotate freely during operation, it can be connected to valve lifter rod 4a, if desired, by a rotary coupling such as a snap ring or ball coupling within a sleeve 8b (FIG. 2). Valve lifter rod 4a opens the valve when retracted by rocker 64a supporting a wheel 64b in contact with a three-dimensional cam indicated diagrammatically at 64 that is shifted axially in operation by a servomotor $S^1$ which is controlled by a central engine management (C.E.M.) computer 305 (FIG. 14) to optimize the valve cut off. The seats of valve 48 can be flat or conical and of such inclinations that they have a common apex to help assure equality of thermal deformation. Both the valve and the seats can be cast from the same material to assure equal thermal expansion. However, if different metals are used, a known form of Skinner self-expanding poppet valve can be used having spring metal packing rings between upper and lower telescopically related valve parts to allow about 0.003 to 0.004 in. telescopic action. Compared to sliding valves, the double seated balanced poppet valves are especially advantageous since being hollow they have a low mass, require no lubrication, have a relatively small lift (travel) for a full port opening and more adequate admission at very early cut off in a variable cut off operation as here. If desired, two side-by-side valves 48 can be connected by a bridge (not shown) for being opened by a single lifter rod.

FIG. 8 shows an alternative unbalanced poppet valve 31 which is biased upwardly to its seated position against a valve seat 32 above it by spring 31a. Threaded onto the lower end of the unbalanced poppet valve 31 is a sleeve 33 with a boss at its upper end that is lowered during operation by a valve lifter viz. a rocker arm 35 having a bifurcated end with an opening 35a extending around the stem of poppet valve 31 for pressing on the boss to open valve 31. The stem of valve 31 extends through a valve guide 31b which is threaded at its outer end into the base 20d of the cap supporting column 20a. Valve 31 can function as a relief valve on the down stroke when pressure in chamber 44 exceeds that in 46.

Figure 13:
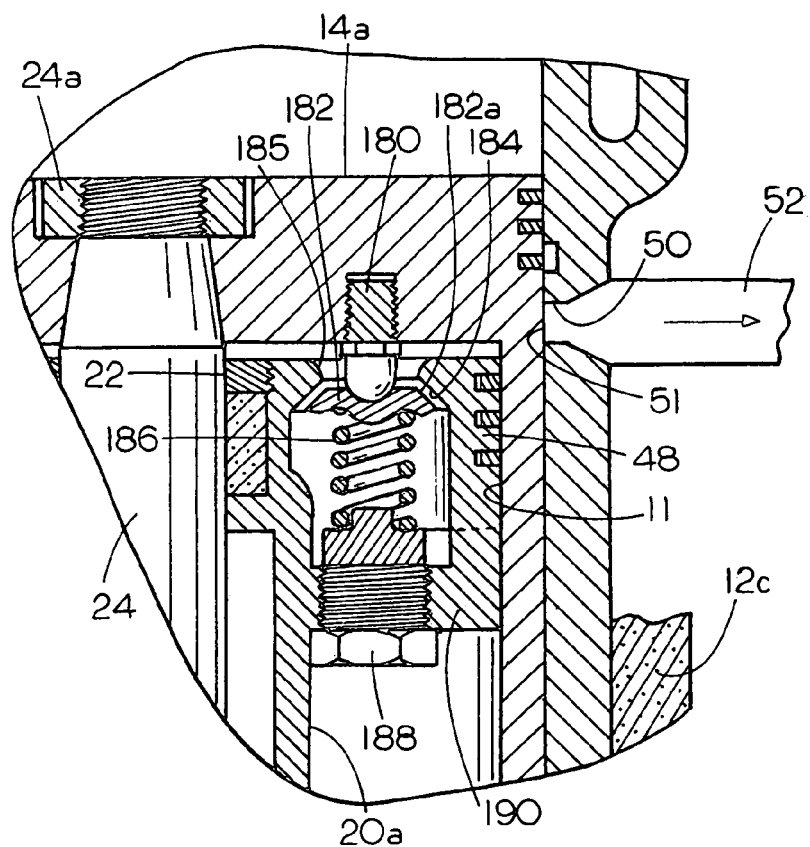
FIG. 13 is a partial vertical sectional view showing a bump valve in accordance with the invention.

Alternatively, in place of a poppet valve, a bump valve 182 (FIG. 13) can be used. The bump valve 182 is opened during operation by a valve lifter 180 threaded into the lower surface of the piston crown 14a in a position aligned with valve 182 so that when the piston descends, lifter 180 will open bump valve 182 by separating its annular valve face 182a from a seat 184 concentric with an inlet port 185 extending through the top of the cylinder head 20 adjacent valve 182. Valve 182 is normally seated by a spring 186 supported by a spring retainer 188 which is threaded through a bridge 190 that is integral with the cylinder head and column 20a. The bump valve 182 provides a fixed cut off. More than one, e.g. four bump valves can be provided in which case the piston 14 should have four aligned valve lifters 180.

Working Fluid

The working fluid used for producing steam can be distilled or deionized water or mixtures of water and alcohol or other known binary fluid mixtures such as ammonia and water as well as hydrocarbon liquids such as isobutane or isopentane among others which is recycled continuously in a sealed circuit. The term "steam" herein is used broadly to include vapors of these and other working fluids as well as steam from water. To prevent freezing when water is used, a small pilot light which consumes only a quart of fuel per week that has been developed by Saab-Scania, Inc., can be used in cold weather. A self-draining system has also been previously developed to avoid freezing.

Collection of Blow-By Gas and Oil

As best seen in FIG. 5 which shows the piston in the bottom dead center position, the piston 14 is provided with a pair of compression rings 54 and a special oil ring 55 that has a pair of vertically spaced apart strippers with sharp downwardly directed edges 55a and 55b that carry excess oil downwardly through the cylinder to a circular collection channel 56 that has circumferentially spaced ports in the cylinder wall 12a above the steam outlet manifold 50. Throughout operation, the collection channel 56 receives and carries excess oil and blow-by gas to the sump 62 through a return duct 60 before it can enter the steam exhaust manifold 50. Any oil that enters the feed water is removed by filtration or by a settling tank or centrifuge (not shown).

Refer now to FIG. 5a which shows an optional alternate form of oil collection channel. In this alternative embodiment, the collection channel 56 that returns blow-by gas and oil to the sump is a continuous groove in the cylinder wall which is provided with a pair of centrally contracting slotted wiper rings 59 that, unlike ordinary piston rings, have a working face on their interior surface against which the piston slides during operation. If rings 59 are used, the skirt of the piston should be iron or aluminum jacketed within a steel sleeve or plated with porous chromium. The rings 59 rest in contact with one another within the groove 56 and press inwardly on the outer wall of the piston. They are pinned in place or to one another with their gaps separated. Each wiper ring 59 has several radial passages or slots 59a through which oil and blow-by gas is carried to the return duct 60 that leads to the crankcase 62. Consequently, the small amount of oil and blow-by combustion gas which is forced past the rings 54 and 55 is caught by the collection channel 56 by wiper rings 59 and is carried to the sump so as to minimize contamination of the steam by combustion gases and waste oil. Remaining oil and particulate matter is removed from condensed steam by filtration and an optional settling tank or centrifugal separator (not shown) if needed. If the centrally contracting wiper rings 59 are used, they can be cut from cast pipe stock of a suitable diameter, then spread outwardly so that the cut ends are separated by a distance of about a ½ an inch enabling the ring to be placed on a circular burnisher of the same diameter as the piston so that the inner working surface can be correctly shaped while expanded to provide a circular inside surface having the same diameter as the o.d. of the piston. Rings can then be pinned to one another with gaps opposite each other to prevent leakage, compressed and installed at the same time.

At the bottom of the piston are two more compression rings 54 (FIG. 2) on opposite sides of exhaust ports 14b. All of the piston rings 20b, 54 and 55 are held in place by pins so that their ends will miss the ports in the wall of the cylinder and piston 14.

Sealing the Cylinder Cap and Exhausting Steam

Refer now to FIGS. 2 and 6. To maintain steam pressure in the steam expansion chamber 44, the cap 20 has three compression rings 20b, the bottom one of which can be an oil ring that skims off excess oil from the inside of the piston 14 and returns it through openings in the cap 20 to the sump 52 through line 20c. During operation, the piston 14 as already noted has a finished cylindrical e.g. polished inner surface which slides on the outer surface of the cap 20. When the exhaust ports are uncovered by the piston openings 14b acting as an exhaust valve, any moisture on the top of the cap 20 is swept out of the cylinder rather than being left in it to be evaporated again during the exhaust stroke as is the case in a counterflow engine. As noted previously, on the down stroke, the remaining steam in the cylinder is compressed in the clearance space to the admission pressure. Lubrication is provided between the cap 20 and the piston 14 by pressure feed line 20f that carries oil from an oil pump (not shown). A spring loaded relief or bypass valve (not shown) can be provided in the cap 20, if desired, to prevent excessive pressures in chamber 44 during start up or in case the condenser fails. Any oil or condensate in the steam chest can be removed through drain 60a.

From the steam exhaust manifold 50; the low-pressure steam passes through pipe 52 to a condenser and then to a boiler which will be described below. From the boiler where it is turned to steam, the steam flows through high pressure steam line 49 to the high-pressure steam chest 46 and into the steam expansion chamber 44 through valve 48 thereby completing an endless circuit as it is continuously recycled throughout operation.

Timing Steam Admission

FIGS. 2-8 and 13 illustrate how steam is supplied to the cylinder. The steam inlet valve 48 is opened by a valve rocker 64a (the end of which is shown partly in section in FIG. 2) supporting wheel 64b in contact with a camshaft 61 which is geared to the crankshaft 30 for opening valve 48 each revolution. The rocker is connected to the crankcase by a pivot pin located behind the wheel 64b. If mounted on the same camshaft that is used for the I.C. valves, the cams for the steam inlet valves should have two lobes 180° apart so that the steam valves open each revolution. The camshaft 61 can be gear-driven, e.g. using helical gears in a known manner for advancing or retarding the camshaft cam 64 thereby advancing or retarding the steam cut off. Alternatively, each cam 64 of camshaft 61 is a three-dimensional cam contoured along its length to provide for different cut offs by the action of servomotor $S^1$ sliding the camshaft 61 axially (FIG. 2) as described above. For example, each cam 64 is shaped to provide, say, a 5% cut off at one end and a 50% cut off at the other. Thus, computer 305 by sliding the camshaft 61 axially can select an optimum cut off to provide the most efficient operation and the best gas mileage for a vehicle.

Engine Management Control

One example of a controller for adjusting each of the engine operating regulators including the inlet valve cut off cam 64 by servomotor $S^1$, the operation of steam throttle T by servomotor $S^2$, and the combustion engine operating controls is a central engine management (C.E.M.) computer 305 (FIG. 14) with components of the same general kind as those used in engine controls for cars and trucks. The C.E.M. is connected to one or more input sensors that indicate the condition of operating variables which are used in the present invention for minimizing fuel consumption at each boiler pressure, engine r.p.m. and loading. The monitored steam engine operating variables are used to continuously control engine operation by adjusting the steam throttle setting T, the variable cut off cam 64 and other engine operating regulators to maximize heat recovery and to minimize both fuel consumption and the discharge of pollutants. The C.E.M. computer 305 is also used to provide cylinder compounding and to balance engine displacement with boiler output as will be described more fully below in connection with FIG. 14 under the heading STEAM DISPLACEMENT CONTROL.

Steam Engine Efficiency and Enthalpy Losses

As seen in FIG. 2, the entire top wall of cap 20 above steam chest 46 (typically about 3 to 6 times the top area of column 20a) keeps the cap 20, valve 48 and piston close to the temperature of the incoming steam as noted above. The lower part of the cylinder can be insulated, a small part of which is shown at 12c, as well as the crosshead guide 27 as partially shown at 20e to minimize heat losses from the steam chest 46.

Engines of the type described for example in U.S. Pat. Nos. 1,324,183 and 3,921,404 operate on a counterflow principle in which steam at atmospheric pressure is exhausted as the piston descends. By contrast, the steam engine assembly of the present invention, which is located below the crown of piston 14, is able to surpass even the performance of the uniflow steam engine which is noted for its unusually high efficiency. In a uniflow engine, steam flows out at the center of the cylinder only during the short period of time when the piston uncovers the exhaust ports but the piston ends adjacent the ring of exhaust ports are unheated. In the present invention, the alignment of ports 14b in the piston skirt with exhaust ports 51 in the cylinder wall allow steam to escape briefly to the exhaust manifold 50 surrounding the cylinder 12 at the upper end of each stroke when the chamber 44 is in an expanded state. When the exhaust ports 51 are uncovered, any moisture that collects on the top of the heated cap 20 will be swept horizontally out of the cylinder, rather than being left for re-evaporation. On the down stroke, steam left in the steam chamber 44 is compressed to the admission pressure but unlike the uniflow engine both upper and lower adjacent surfaces of the clearance space 44 are heated (the crown of the piston 14 being heated by the I.C. combustion chamber and the lower end of the cylinder including the cap 20, valve 48, and piston skirt being heated by the high-pressure steam in chamber 46) thereby keeping the cylinder and piston hot. In this way, potential chilling of engine surfaces is prevented more effectively than in the uniflow engine. Steam recompression as in a uniflow engine avoids the intermittent cooling that takes place in a counterflow steam engine while the heating of the cap 20 adjacent the exhaust ports 51 minimizes condensation of the fresh charge of steam thereon, thus maintaining a level of efficiency higher than that of the uniflow engine. FIGS. 2, 7 and 8 show how the cap 20 containing the steam intake valve 48 is steam jacketed to provide heat for keeping the steam cylinder head surface of 20a heated adjacent the ring of exhaust ports 51 throughout operation.

Steam engine efficiency is also enhanced by the direct conduction of heat from the burning gas in combustion chamber 34 through the top 14a of the piston to the steam under the piston. Of the fuel heating energy that is lost when the fuel is burned, about 8% is lost during combustion and about 6% during expansion. Much of this lost heat is transferred into the crown and upper part of the piston and in turn to the steam in chamber 44. The head of the piston can be maintained at a safe operating temperature due to the large volume of steam passing through the chamber below the piston.

To further improve efficiency, and make up for the negative torque on the down stroke (especially at low speeds), the steam chamber 44 is optionally connected to an auxiliary displacement chamber 45 (FIG. 2) in the piston head of, say, 2 in.$^3$ for a steam cylinder displacement of 40 in.$^3$ through a throttling duct or restriction 47 of about 0.18 inch in diameter to act as a variable auxiliary clearance volume for limiting down stroke compression pressure in chamber 44 to throttle pressure at various throttle settings based on a known flow throttling principle so as to provide a greater effective clearance volume at low r.p.m.s due to the greater flow through the restriction while providing reduced flow at high r.p.m.s thereby limiting the charge entering the cylinder. This action provides the effect of an earlier cut off at high r.p.m.s for increasing Rankine engine efficiency. This feature and the net positive torque of three out of each four strokes provided by I.C. and steam power working together results in a reasonably even running engine. A negative torque of about 10-12% of the net positive torque of the other three strokes will occur only during the I.C. intake stroke. The invention provides more even torque than an I.C. engine for a given number of pistons since the steam below each piston will provide one power stroke per revolution and greater torque at reduced r.p.m.s because steam engines do not need high revs to develop their power. A 4-cylinder engine will have six power strokes instead of two per revolution including four from steam expansion.

Lubrication can be supplied in any suitable manner, e.g. by means of continuous pressure feed lines 20f and 57 (FIG. 2) and 177 (FIG. 15) which meter oil to the cap wall, the piston and cylinder through the cylinder wall as well as by conventional pressure feed through the crankshaft and connecting rod or by a splash or oil jet from the sump (not shown).

Thermal Energy Recovery

Figures 9, 9A:
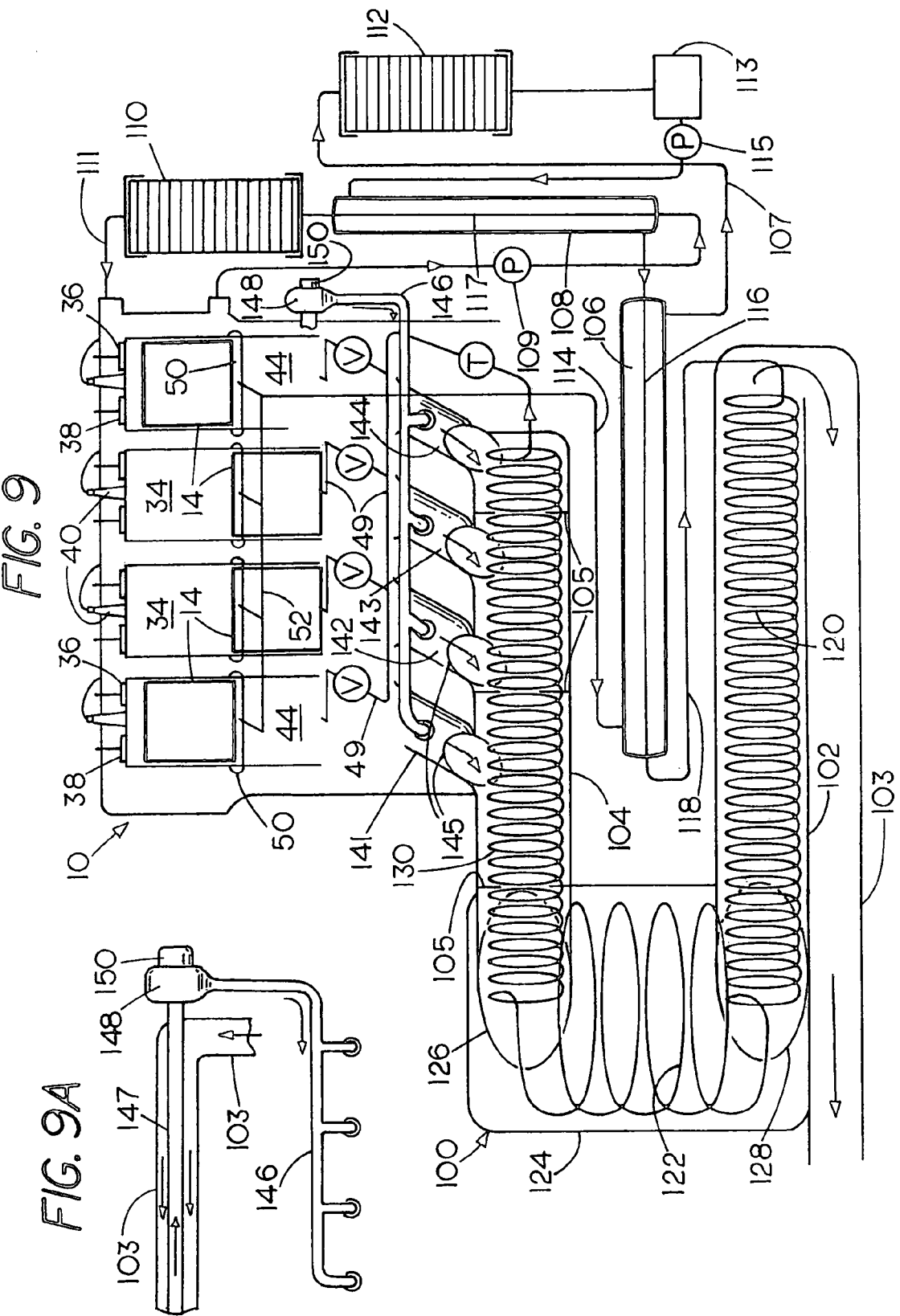
FIG. 9 is a schematic diagram of the invention as applied to a 4-cylinder car engine showing steam circulation.
FIG. 9A is a schematic diagram to show the source of supplemental combustion air fed to the afterburner.

Refer now to FIG. 9 which illustrates one preferred form of thermal recovery assembly and method in accordance with the present invention. In a typical I.C. engine, the brake power output is about 25-28% and losses amount to about 72-75% of the heating value of the fuel under the conditions of use (see *I.C. Engine Fundamentals* by J. B. Heywood, 1988 page 674). I.C. energy losses include those from the exhaust, the coolant and miscellaneous losses such as radiation from the engine and exhaust system and exhaust kinetic losses. The system for recovering this thermal energy shown in FIG. 9 includes the engine 10, a boiler 100, an economizer 102, a steam superheater 104, two countercurrent [liquid-to-liquid] heat exchangers 106 and 108, a condenser 112 and radiator 110. As outlined above, the low-pressure steam is collected in a chamber or manifold 50 surrounding each of the cylinders and is exhausted through the low-pressure steam return line 52. The steam return line 52 is connected by line 114 to the countercurrent flow heat exchanger or regenerator 106 which can consist of a pair of tubes mounted one inside the other, the inner one being formed from a material such as copper that is a good conductor of heat. Regenerator 106 acts as a secondary preheater for preheating the feed water flowing through the inner tube 116 which is then carried to the economizer 102 through line 118. The economizer 102 can be in boiler casing 124 but if separate (as shown) better counterflow heat transfer is assured. The economizer 102 in the example shown is a countercurrent flow heat exchanger in which preheated feed water is heated further by engine exhaust gases that flow in heat conductive relationship with the feed water passing through a coil of tubing 120 within the economizer for providing preheated water to the boiler 100.

While various boilers can be used, a monotube boiler or flash boiler of seamless steel or nickel alloy tubing typically ⁷⁄₁₆" diameter coiled in a series of flat spirals or wound to form concentric flustocones or as described in U.S. Pat. No. 5,845, 609 is preferred. The coils of tubing 122, in the boiler, that receive the preheated feed water from the economizer 102 are in this way exposed during operation to the continuous circular flow of hot engine exhaust gas that enters the casing 124 of the boiler 100 through tangential inlet opening 126 and leaves through a tangential outlet opening 128 in the opposite direction from the flow of feed water and steam through the coil 122 to again provide a countercurrent-flow exchange of heat so that the last of steam to leave the top coil 122 of the boiler has been heated the most and is exposed to the highest temperature engine exhaust entering through the tangential inlet opening 126 at the hottest part of the boiler 100. While only a few coils have been shown in the boiler, many more are used in practice. A length of ⅝ inch o.d. mild seamless steel tubing that makes a total of 24 flat coils of 17.5 feet each totaling 420 feet of tubing (which amounts to 75 square feet of heating surface) can provide a 20 HP boiler. Although the boiler shown and described is preferred, other known tube boilers can provide efficient energy recovery. For example, a LaMont flash tube boiler developed an efficiency of 85% (see *Heat Engines* by R. H. Grundy, 1952 pages 452 & 453) and a Benson boiler during tests yielded a thermal efficiency of about 90% (see *Theory and Practice of Heat Engines* by D. A. Wrangham 1960 pages 710 & 711). The present invention is able to provide equal or better efficiencies since the temperature of gas in the boiler 100 is not reduced by dilution with a relatively cool incoming air stream as is the case in an ordinary boiler in which air is blown by a fan into the burner of the boiler. The heating rate in a tube type boiler is also faster than a standard boiler. Some flash tube boilers can get high steam pressure in as little as 15-30 seconds which indicates that quite efficient heat transfer is being achieved. A circulation pump in a parallel circuit (not shown) can be provided to maximize heat transfer.

Figure 9B:
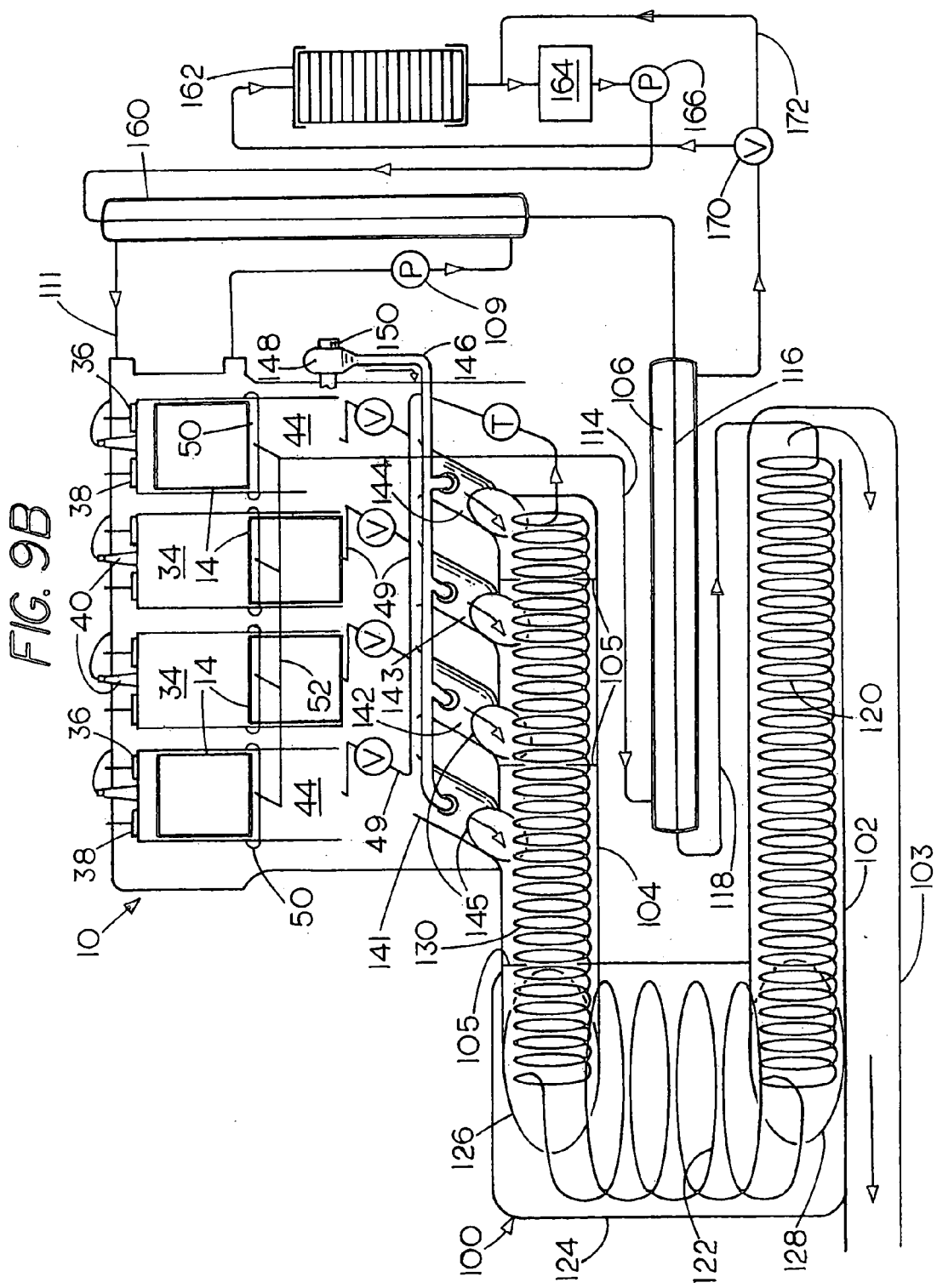
FIG. 9B is a diagram similar to FIG. 9 showing an alternative condenser and heat recovery circuit.

Refer now to FIG. 9B which illustrates a somewhat different circuit for steam and coolant circulation. In FIG. 9B the boiler, the auxiliary combustor and economizer are the same as already described in connection with FIG. 9 but the following components are arranged differently: condensate preheater 160, condenser 162, filter 164, condensate pump 166 and a thermostatically controlled bypass valve 170. In operation, wet steam and condensate from the regenerator 106 flows through the bypass valve 170 to the top of condenser 162. However, at lower condensate temperatures, valve 170 allows a greater fraction to bypass the condenser 162 through pipe 172 to filter 164 from which it is fed by condensate pump 166 to the first stage countercurrent flow condensate heat exchanger 160 where it is heated as closely as possible to a temperature approaching that of the hot coolant leaving the engine for a maximum temperature gain e.g. to about 100° C.-115° C. Engine coolant itself is fed in the opposite direction by water pump 109 so that upon exiting through pipe 111, it will have transferred virtually all of its thermal load to the condensate while being cooled as it reenters the engine 10 to the temperature of the condensate leaving condenser 162. The bypass valve 170 diverts as little as possible through the condenser 162 for maintaining the condensate and coolant at the optimum design temperature selected for the particular engine 10 that is used. Circulation of the steam to and from the engine through the economizer 102 and the secondary condensate preheater 106 is the same as already described in connection with FIG. 9.

The thermal energy recovery method and apparatus of the present invention, as described above and particularly in connection with FIGS. 9, 9A, and 9B, is outstanding for application in an automobile or other vehicle because of its high efficiency in recovering waste heat and its relatively light weight. However, other heat exchange arrangements are well known as described for example in U.S. Pat. Nos. 4,087,974; 4,201,058; 4,300,353; 4,351,155; 4,803,958; 6,834,503; 6,964,168; 7,013,644, some of the features of which can also be used in recovering waste energy from the internal combustion section of the engine of FIGS. 1-8. All references cited are incorporated herein by reference as fully and completely as though they were reproduced in full in the text of the present application.

FIGS. 9-9B are intended to diagram the circulation of steam and coolant in a general way. Other well known components (not shown) including temperature and pressure sensors, check valves, liquid storage tanks, thermostatic engine coolant valves, fans for radiator/condenser, pressure gauges and relief valves, drains, and the like, all familiar to those skilled in the art are used conventionally. To minimize heat loss, components that are at elevated temperatures are thermally insulated conventionally for example as shown partially in 12c and 20e in FIG. 2.

Superheater Assembly

In accordance with the present invention, a superheater 104 is provided at the location of the exhaust manifold of a standard I.C. engine. The superheater 104 which is somewhat larger than a standard exhaust manifold of an ordinary I.C. engine acts as an afterburner that forms part of an exhaust manifold for recovering additional waste energy while removing some pollutants e.g. CO and hydrocarbons. Inside is a series of coils 130 of stainless steel tubing for superheating the steam produced in the boiler 100 by heat transferred from the engine exhaust gases introduced into the superheater 104 through exhaust gas inlet pipes 141-144 which are themselves connected directly to the exhaust passages 37 in the cylinder head 35. Because the superheater 104 is between the boiler and the cylinders and is connected in close proximity e.g. 2-10 inches from the exhaust ports 37 by inlet pipes 141-144, the coils of tubing 130 inside it are exposed to the greatest heat with steam flowing counter to the flow of exhaust gases. To maximize exhaust gas temperatures while also reducing pollutants, heated secondary air is injected into pipes 141-144 via injectors supplied with air from a blower 148 via air supply line 146. FIG. 9A shows how supplemental air entering pipe 147 is heated by I.C. exhaust pipe 103 as blower 148 transfers it to I.C. exhaust passages 141-144. It can therefore be seen that the coils 130 are exposed to both combustion products; those produced in the engine cylinder as well as those that result from the combustion of unburned gas that takes place within the superheater due to the injection of secondary air. The blower 148 e.g. a positive displacement vane or roots blower can be driven from the engine, by an electric motor 150 or by a small capacity exhaust gas or steam turbine (not shown) connected to line 114. Exhaust gas entering the superheater 104 through the exhaust passages 141-144 can be as high as about 900° C. but the most common range is about 400° C.-600° C. The auxiliary air supply introduced through the supplemental air supply line 146 will oxidize much of the unburned hydrocarbons and carbon monoxide present in the exhaust gas which may amount to as much as 9% of the heating value of the fuel. To optimize combustion and increase residence time, the superheater 104 is made much larger than a standard exhaust manifold, typically around 6-8 inches or more in diameter for a four-cylinder engine. Optional swirl guides 105 with pitched radial blades give the gas a swirling action and increase residence time within the superheater 104 to enhance the combustion of unburned gas which is advantageous since it has been found that a 1.5% CO removal results in a 220° K temperature rise (Heywood Id. page 658). It will be seen that the superheater 104 is an afterburner that is made an integral part of the exhaust manifold itself where the I.C. exhaust gas at the highest temperature enters at several e.g. 4 points with combustion taking place therein where the monotube boiler steam runs in a counterflow direction to incoming exhaust gas to thereby provide superheat at the highest temperature since the monotube boiler line passes through the afterburner, entering furthest from the engine and leaving near the upstream end of the afterburner. It will also be noted that the steam flows from the boiler into the superheater which receives upstream exhaust gases just as they exit the engine and while they are being further heated by the combustion of previously unburned hydrocarbons and other combustible gases resulting from the injection of hot air from the secondary air supply line 146. Consequently, the invention makes possible the recovery of heat from unburned gas and fuel which in an ordinary engine amounts to about 3-9% of the heating value of the fuel.

Briefly, the circulation of steam and condensate is as follows: from the engine exhaust through lines 52 and 114 then, through regenerator 106 and line 107 to the condenser 112. Condensate from the condenser passes through filter 113, pump 115, through the first preheater 108 then through regenerator 106 (leaving at 220° C.-240° C.) to the economizer 102, boiler 124, superheater 104 then through steam throttle T, high-pressure steam line 49 and solenoid operated selector valves V to the steam chambers 46 and inlet valves 48. The condensed steam is fed by condensate pump 115 from a filter 113 to a primary heat exchanger 108 where it is heated by the engine coolant fed in the opposite direction through a line 117 by a pump 109. Thus, the engine coolant transfers its heat to the condensate first and is then cooled further by passing through the radiator 110 from which it is circulated back through the engine cooling passages 35 and 12b via hose 111.

The driver's foot throttle lever can control the throttle set point as a command to C.E.M. computer 305 which in turn positions the servos $S^1$ and $S^2$ for the cut off and steam throttle respectively to optimize efficiency and maximize gas mileage continuously while the vehicle is in operation. Engine power can be thus controlled by a combination of steam throttle T and cut off settings to minimize fuel consumption. Alternatively, the steam throttle T can be operated for example as described in U.S. Pat. No. 4,300,353 with pressure and temperature controlled as described in the Carter U.S. Pat. Nos. 3,908,686 and 4,023,537. The drivers foot throttle can be set to open the steam throttle T before the I.C. throttle is opened to use stored energy, if any, before burning more fuel, with continued movement of the foot pedal then set to open the I.C. throttle.

Steam Displacement Control

One objective of the invention is to operate efficiently at a variable load and boiler pressure that results from variations in waste I.C. heat and vehicle driving requirements. Some boiler output accommodation can be accomplished with the variable cut off 64. However, the invention also includes a mechanism for changing steam displacement to provide the required flexibility under varying operating conditions. In accordance with the invention, valves V are opened sequentially by the C.E.M. computer to increase displacement and are closed sequentially by the C.E.M. computer to as closely as possible match steam engine displacement with the steam output entropy from the boiler and superheater, the objective being to maintain a more constant ratio between them throughout operation as the engine speed changes during startup and under varying traffic conditions. To accomplish this, an engine load sensor (torque meter) or a steam pressure sensor at the boiler or cylinder is connected to the C.E.M. computer 305 which opens valves V in a step-wise manner as boiler output rises. Consequently, when the boiler output is low, only one or two steam cylinders are used with more added as the boiler output increases to maintain good efficiency as the heat output of the I.C. engine changes. For example, in a steam powered car, other things being equal, lowering steam engine displacement from an excessive displacement of 200 CID to 140 CID at a constant steam rate of 8.5 lb./HP-Hr. is calculated to improve fuel economy from 9.9 MPG initially to 14.4 MPG (a substantial 45% improvement in fuel economy) by better matching boiler output and engine displacement.

Figure 14:
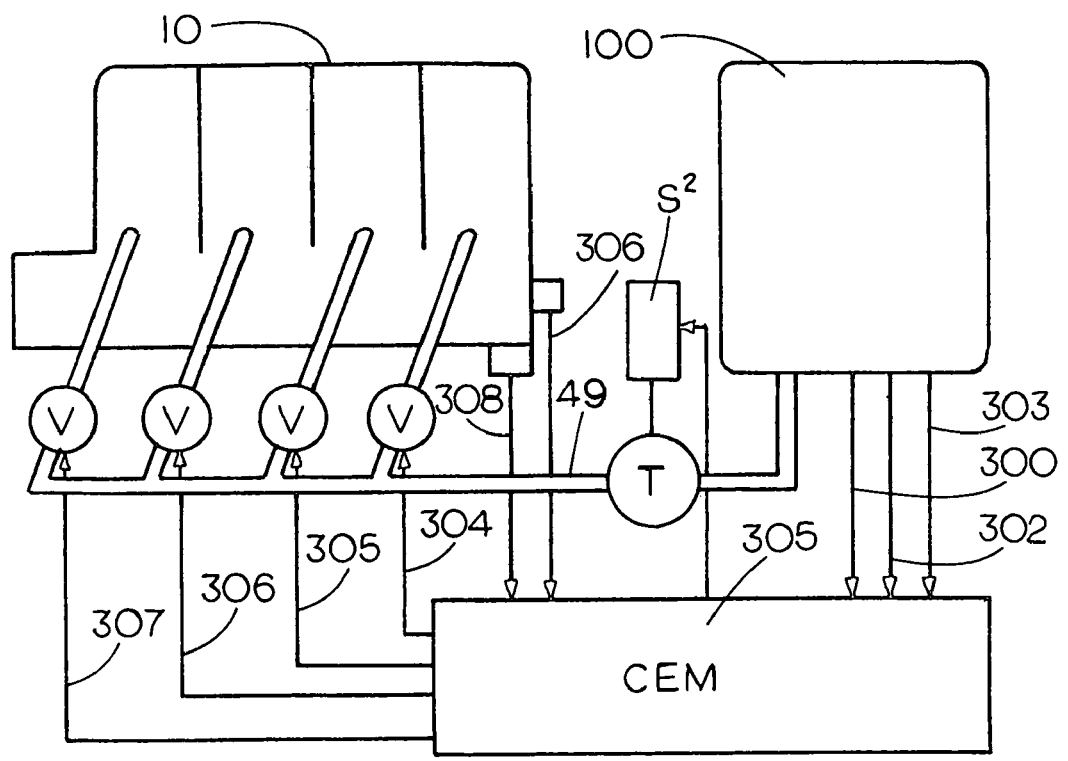
FIG. 14 is a schematic diagram showing the control used for changing engine displacement during operation.

One example of an engine displacement control in accordance with the invention is shown in FIG. 14. It will be seen that steam is fed to the cylinders of the multicylinder engine 10 from boiler 100 through throttle T via steam line 49 and four solenoid operated valves V to the engine cylinders as described above. The boiler is provided with sensors for operating variables such as temperature and pressure sensors (not shown) which are connected to the engine management computer 305 by conductors 300, 302 and by conductor 303 for indicating heat supplied to the boiler (BTU/Hr). The load on the engine 10 and engine r.p.m. is transmitted to the C.E.M. 305 via lines 306 and 308. While the engine is running, the C.E.M. carries out real time computation of the optimum engine displacement under existing operating conditions for achieving the best gas mileage. This result is then used to operate the solenoid controlled valves V via conductors 304-307. If each steam cylinder of the engine 10 has the same displacement, then the valves V are opened in sequence to provide engine flexibility with respect to boiler output by matching displacement with the operating conditions being experienced so as to increase the displacement, e.g. in a step-wise manner from 15 in.$^3$ to 30, 45, and finally 60 in.$^3$ as the steam pressure, temperature or heat supplied to the boiler increases while reducing the displacement responsive to decreased boiler output or engine load, all according to predetermined operating parameters for maintaining the best steam engine efficiency under the conditions of operation sensed by the computer while the engine is running as well as before starting or when coasting down. When there is no load on the engine, e.g. when coasting, the throttle T or all valves V are shut by the C.E.M. computer 305 but this is overridden upon depressing the foot throttle. Other operating variables such as I.C. manifold pressure and vehicle speed can be monitored to provide additional operating conditions to the controller 305 as well as those indicated. In designing the engine, the optimum displacement chosen for steam operation can be achieved by selecting a particular piston i.d. or piston rod o.d. If a thicker piston skirt is needed, an optional dead air space can be provided in the piston between the piston skirt and a concentric liner sleeve (not shown) if desired. Admission valves of non-functioning steam chambers can be held open as exhaust valves are held open in U.S. Pat. No. 2,196,980 if desired.

Steam Cylinder Compounding

It is well known that a compound steam engine can provide greater efficiency at pressures over about 150 pounds per square inch. Using the solenoid operated valves (not shown) between the exhaust line 52 of a cylinder and the high pressure steam line 49 of one or more cylinders, exhaust steam from one cylinder can be sent to a cylinder made with a greater displacement or to two or more cylinders of the same displacement to achieve compounding through automatic control thereof by the C.E.M. computer e.g. from cylinder 1 to both of cylinder 2 and 3 with no receiver.

Heat Transfer and Operating Temperatures

As in any engine, it is necessary to maintain components at temperatures that will not impair proper lubrication. In a typical water-cooled four stroke spark ignition engine that was tested, temperature measurements taken at the top of the piston and at various locations around and behind the top ring varied from about 290° C. to about 340° C. Therefore, running the engine 10 with steam at 300° C.-350° C. should be acceptable for all applications since both aluminum and cast iron pistons can operate with the piston head at temperatures ranging from 200°-400° C. in a standard I.C. engine. The exhaust valve and spark plug can safely run at around 310° C. to 340° C. In the present invention, the I.C. head and cylinder are both water cooled. Since the cylinder walls of the combustion chamber are cooled by the water jacket, the piston head has the greatest potential for overheating. Heat transfer and cooling of the piston 14 is an important consideration. As seen in FIG. 2, when the steam inlet valve 48 opens, the pressurized steam will stream upwardly and rush across the lower surface of the piston head 14a and will thereby carry away excess heat as its enthalpy rises. At typical highway cruising speeds as much as about 0.3 lbs. of steam per second will flow across the lower surface of the piston head for carrying away heat so as to avoid overheating of the piston head even though the initial temperature of burning gas in the combustion chamber ranges from 2000° C.-2400° C. It will be noted that the invention makes it possible to conserve energy due to the direct conduction of heat from the combustion chamber to the steam streaming across the lower surface of the piston head as the steam is introduced beneath the piston thereby raising the pressure of the steam while at the same time combustion heat also prevents condensation of the steam on and around the piston head. If desired, the lower surface of the piston head can be provided with cooling fins to promote heat transfer to the steam.

Thermal Losses that are Available for Recovery

The following tables showing fuel energy utilization and loss are derived from Heywood Id. 1988, pages 674 and 675. To evaluate efficiency, brake power is compared with heat transferred to the coolant and to the exhaust as well as other losses that together make up the lower heating value of the fuel being used.

TABLE 1

TYPICAL FUEL ENERGY DISTRIBUTION IN SPARK IGNITION ENGINES

| | | |
|---|---|---|
| Brake Power | 26% | |
| Lost to Coolant | 23% | Available for Recovery |
| Miscellaneous Losses | 8% | |
| Sensible exhaust enthalpy | 26% | Available for Recovery |
| Kinetic exhaust enthalpy | 3% | |
| Lost to exhaust systems by radiation | 5% | |
| Incomplete combustion | 5-9% | Available for Recovery |
| | 100% | |
| Total available for recovery: | 54-58% | |

TABLE 2

FUEL ENERGY DISTRIBUTION OBSERVED IN 6 CYLINDER SPARK IGNITION AUTOMOBILE

| | 43 MPH 1100 RPM | 72 MPH 1800 RPM | |
|---|---|---|---|
| Brake Power | 18% | 21% | |
| Coolant Load | 54% | 43% | Available for Recovery |
| Exhaust enthalpy | 21% | 27% | Available for Recovery |
| Misc. radiation from exhaust systems | 2.5% | 3.2% | |
| Incomplete combustion | 4.5% | 5.8% | Available for Recovery |
| | 100% | 100% | |
| Total available for recovery: | 79% | 76% | |

The heat rejection rate to the coolant changes under different operating conditions. In an automobile at low speeds and loads (Table 2), the coolant heat transfer rate is much greater, amounting to as much as 2-3 times the brake power.

Determination of Energy Recovery

For a four cylinder spark ignition four stroke automobile engine operating as set forth in Table 1 and assuming an I.C. engine rated at 100 I.C. HP, the brake I.C. power produced under highway conditions would be 26 HP with 54% of the fuel heating value being available for recovery. Assuming the boiler is 85% efficient and the steam engine operates as a high-pressure superheated condensing engine having an actual brake power efficiency of 24% (see *Heat Engines*, Allen Bradley, page 407), the combined efficiency is therefore 20%×54 HP or 10.8 HP for an improvement on the order of 41.5%. Using the lost energy percentage values of Table 2 derived from a vehicle traveling at either 43 or 72 MPH, the potential recovery is 20%×79%=15.8% which amounts to an 87% improvement in gas mileage at 43 MPH. At 72 MPH with the energy available for recovery of 76%×20% efficiency=15.2% of the thermal energy available for a brake power improvement of 72%. Consequently, the improvement in gas mileage that can be achieved through the use of the invention based on empirical test data varies from about 41% to about 87% above the gas mileage otherwise achieved.

Recovery of Unburned Fuel Energy

As already noted, unburned fuel contributes about 3-9% to the waste exhaust gas enthalpy. Burning it can raise the temperature of the exhaust gas as much as 200° K. Running at high speed, engine exhaust from a typical vehicle engine will range from about 400° C.-900° C.

As seen in FIG. 9A, an inlet pipe 147 connected to the inlet of the air pump 148 is in a countercurrent heat exchange relationship with the exhaust pipe 103 for recovering exhaust heat and transferring it to the air that is forced by the blower 148 through the air injector line 146 into each of the exhaust passages 141-144 to supply oxygen for burning hydrocarbons within the superheater 104. The exhaust passages 141-144 enter the superheater 104 through tangential ports 145 which cause the exhaust gases to swirl as they flow through the superheater 104. The swirling action is sustained by the pitched swirl plates 105 which act like a helix to help ensure complete mixing of the hot secondary air so as to achieve total combustion as well as reducing the emission of pollutants. Thus, the tangential inlets 145 begin the swirling motion and swirl plates 105 promote both swirling and agitation so as to assure complete mixing of the secondary air which cooperates with the large (6" to 8" diameter) size of the superheater to oxidize the unburned constituents thereby raising the temperature of the exhaust to between 600° C.-900° C. or more. This temperature is well above that required for virtually complete combustion of both unburned hydrocarbons (requiring about 600° C. for 50 m.s.) and CO (requiring about 700° C. for about 100-150 m.s.). By placing the steam coils 130 within it, the superheater 104 serves as a burner or furnace due to the injection of hot secondary air through air inlet line 146 causing the steam in the last coils 130 to reach a higher temperature than it would in an ordinary engine exhaust manifold thereby further improving Rankine engine efficiency in the engine expansion chamber 44 due to the higher temperatures and pressures achieved.

Thus, running at a speed of about 70-75 MPH with the exhaust gas in the superheater at a temperature of around 900° C.-1000° C. due to the additional heat provided by combustion of unburned fuel, steam at the throttle T at designed flow rates can be heated to over 500° C. (932° F.). It is apparent, therefore, that high steam temperatures and pressures necessary for efficient Rankine engine operation are readily obtained by means of the invention.

Recovering Momentum of Vehicle

Figure 12:
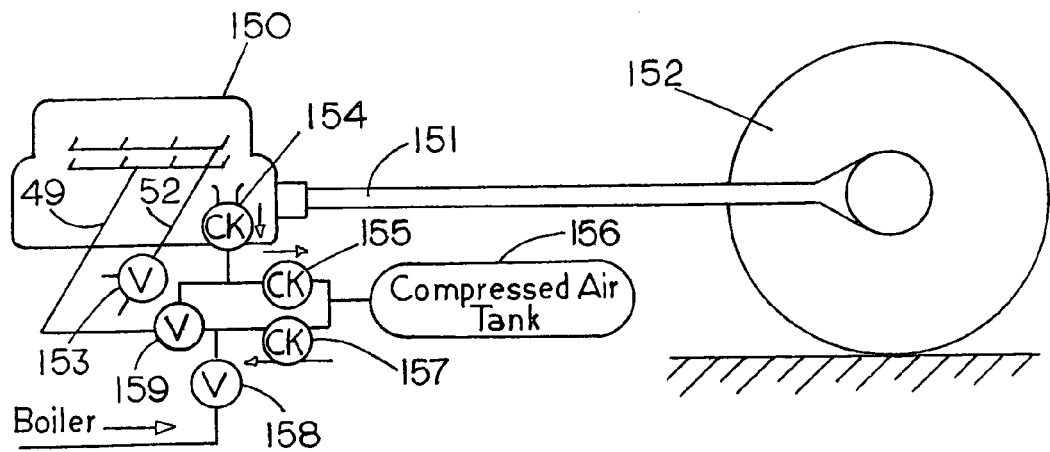
FIG. 12 is a schematic diagram showing the recovery of braking energy.

Refer now to FIG. 12 which illustrates the recuperation of kinetic energy during braking in accordance with the invention. A four cylinder automobile engine 150 of this invention e.g. FIGS. 9-9B is shown connected by a drive shaft 151 to a drive wheel 152 resting on the ground. The illustration shows a solenoid operated selector valve 153 in steam outlet line 52 and a solenoid valve 158 in the steam line leading to the boiler. Also in line 49 is a solenoid selector valve 159 that is connectable via a first air line to a check valve 154 for receiving ambient air and a check valve 155 coupled to compressed air tank 156. The selector valve 159 can also connect line 49 via a second air line through check valve 157 to the compressed air tank 156. When the brakes are applied, the poppet valves 48 inside the engine 150 are held open by the engine management computer and selector valve 159 connects tank 156 to line 49 via valves 154 and 155 so that the changing volume of the steam expansion chambers 44 (FIGS. 1 and 2) forces air under pressure into tank 156 until the vehicle stops thereby storing kinetic energy in the form of compressed air. When the accelerator is depressed by the driver, the solenoid operated selector valve 159 connects tank 156 to line 49 through the check valve 157 while valve 48 operates normally as it does during steam operation thereby propelling the vehicle ahead due to the expansion within the steam chamber 44 of the compressed air that was stored during braking. Compressed air is vented through valve 153. In this way, the invention provides a vehicle that is propelled by a combination I.C. and steam power that was derived from thermal energy recovered from waste I.C. engine heat and momentum by selectively connecting a steam expansion chamber of the engine to a compressed air storage tank through valving that directs the flow of air from the expansion chamber either into a storage tank during braking of the vehicle or to move ahead, connects the steam expansion chamber to the air tank for directing compressed air from the air tank into the steam expansion chamber. With a cold engine and no steam pressure, the compressed air is able to provide a fast start even before raising steam as well as enhanced fuel efficiency during start up.

Stepped Piston Alternative

Refer now to FIGS. 10 and 11 which illustrate an alternative embodiment of the invention that employs a stepped piston 80. While this variation of the invention makes use of a different piston construction, it is also able to recover power from waste I.C. heat. The modified engine 79 shown in FIGS. 10 and 11 operates to achieve the same general objectives already outlined; better efficiency and gas mileage, but instead of having a steam expansion chamber inside the piston, the stepped piston 80 is provided with compression rings 80a at its upper end and an enlarged diameter 80a in the skirt area at its lower end that is provided with compression rings 80b. The combustion chamber 34 as well as the cylinder head 35 and its components are the same as already described above. The piston 80 fits sealingly for sliding motion in a cylinder 82 that has an enlarged cylindrical lower bore section 84 to accommodate the enlarged skirt portion 80a, thus providing an annular steam expansion chamber 86 in the enlarged bore section 84. Both its combustion chamber 34 and the steam chamber 86 are adjacent the piston and chamber 34 is located adjacent the bottom portion of the piston 80. Lubricating oil is supplied under pressure through lines 9a and 9b to the inside wall of the cylinder. In operation, steam enters the steam expansion chamber 86 through an inlet valve 92 and port 91 from high-pressure valve chest 94. When the piston reaches bottom dead center and uncovers openings in the cylinder, steam is exhausted through a steam manifold 88 provided in the part of the engine cylinder block 89 that encircles the enlarged bore 84 from which it flows through a closed circuit like that described above including a condenser (not shown) through a check valve e.g. reed valve 9c via a low-pressure steam return line 90. The piston 80 located as shown between the combustion chamber 34 above the piston and the steam chamber 86 is connected to a crankshaft 87 by a wrist pin 83 and connecting rod 85. Waste combustion heat from the I.C. chamber 34 is recovered in a boiler and steam circuit as shown and described above in connection with FIGS. 9-9B to provide steam to chamber 86 for driving the piston 80 downwardly each revolution of the crankshaft 87. This is not a preferred embodiment in part because the large surface to volume ratio of the annular steam expansion chamber 86 will promote cooling resulting in reduced steam pressure. Flow restriction around the piston will also produce greater breathing losses, longer rings 80b result in increased mechanical losses and there is no heated surface adjacent steam outlet 88.

Characteristics and Unexpected Results

In one exemplary form, the invention provides a cylinder and piston with combustion and steam power acting on the same piston and a circular steam exhaust manifold and exhaust valve at about the same level as a steam inlet valve that opens through a cylinder cap supported approximately midway between the ends of the cylinder. From FIG. 1, it can be seen that the invention provides even better protection against the chilling of the metal surfaces by low-pressure exhaust steam than the uniflow engine. A uniflow engine exhausts steam at the piston head and there is no way to heat the surface of the uniflow piston head at the surface where steam is released. By contrast in the present invention, low-pressure steam is exhausted at the cap 20 comprising the steam cylinder head, exactly where the most heat is being supplied to the steam expansion chamber by the adjacent steam chest 46. Consequently, the present invention provides better heat loss protection and therefore greater efficiency than a uniflow engine. The invention provides better protection against thermal losses during operation in part through the provision of an intake valve in the cap that opens into the steam chest and in part through the double ported automatic exhaust valve having ports in both the piston as well as in the cylinder wall which are covered when steam is admitted but open adjacent a heated surface when aligned while the steam chamber is in an expanded state. Moreover, low-pressure exhaust steam is not ducted below the head where it could cool the head or the steam chest which in the invention jackets the entire lower surface of the steam cylinder head above steam chest 46 to prevent it from being chilled by low-pressure steam as well as heating the lower end of the cylinder and the skirt of the piston.

In addition, the invention provides an oil ring on the piston for stripping excess oil from the cylinder and depositing it in an annular collection channel that is built into the wall of the cylinder at a point located in alignment with the oil ring when at bottom dead center for carrying excess oil and blow-by gas to the sump. Optionally, the collection channel holds one or more wiper rings that press centrally against the outer wall of the piston for capturing excess oil and blow-by gas and ducting it to the engine sump before it can reach the steam outlet manifold.

The invention also provides a combination combustion and steam piston that is secured to a piston rod which passes through a stationary cylinder cap or disk that is itself positioned concentrically within the cylinder at the upper end of a supporting column enclosed by an annular space that acts as a steam chest and accommodates the skirt of the piston as it slides through the cylinder over the cap. Besides sealing the steam expansion chamber 44, the stationary center cap also provides support for the steam inlet valve, reduces the steam clearance volume between its upper surface and the piston, defines the top of the steam chest, heats the steam exhaust area and supports packing around the piston rod to prevent the escape of steam. By providing a piston with a skirt that is in sealing and sliding relationship between both the steam cylinder head and the cylinder walls, the added length of the cylinder needed to accommodate steam is minimized since the steam chamber and I.C. chamber occupy the same space. In addition, the invention provides an improved system and sequence of heat transfer devices for efficiently recovering waste combustion heat from the I.C. engine assembly.

In summary, the invention provides the following benefits and unexpected results among others: 1) the efficiency of a uniflow engine while adding as little as possible length to the engine cylinders so that the engine is not a great deal taller or heavier than an equivalent I.C engine, 2) the steam expansion chamber occupies the same space as the combustion chamber of the I.C. engine, 3) the steam expansion chamber is heated by direct thermal transfer from the I.C. engine combustion chamber, 4) the burnt oil from the I.C. chamber as well as blow-by gasses are kept separate from the steam expansion chamber and the exhausted steam, 5) the exhaust valve does not exhaust low-pressure steam below the steam cylinder head where it could cool incoming steam or interfere with steam jacketing of the steam cylinder head, 6) clearance volumes are as small as desired since the opposing surfaces of the piston and cap forming the steam piston head are both flat, 7) the exhaust valve when opening sweeps adjacent steam and moisture if any out of the cylinder, then closes so that the cylinder pressure is brought up to about the steam admission pressure thereby preventing steam at atmospheric pressure from washing heat from the cylinder walls and head, which if it occurred could cause condensation of incoming steam, 8) cylinder walls are exposed to exhaust steam pressure only for the short period that the exhaust port is uncovered, whereupon the pressure and temperature immediately begin to rise so that at the end of the down stroke the temperature and pressure is such that the incoming steam meets relatively hot surfaces thereby preventing condensation and 9) unlike a uniflow engine, the metal surface at the end of the steam chamber adjacent the exiting steam is externally heated so as to prevent steam at atmospheric pressure from chilling or condensing the incoming charge of steam.

Many variations of the present invention within the scope of the appended claims will be apparent to those skilled in the art once the principles described herein are understood.

What is claimed is:

1. A combination internal combustion and steam engine that is powered in part by steam from a boiler or superheater fired by waste internal combustion heat comprising:
   at least one cylinder with a piston sealingly mounted for reciprocation therein between an internal combustion chamber and a steam chamber located inwardly of the combustion chamber that act upon opposing ends of the piston for imparting a movement thereto,
   a steam cylinder head comprising a stationary circular cap inwardly of the steam chamber that is sealingly and slideably engaged with an inner surface of the piston, and a rod located to move through the cylinder between the steam cylinder head and a crankshaft and being operatively associated with the piston and the crankshaft for imparting rotation thereto, and
   at least one steam inlet valve within the stationary circular cap that communicates between the steam chamber and a steam chest that is located inside the cylinder on an opposite side of the stationary circular cap from the steam chamber to accommodate and heat the piston and to steam jacket the stationary circular cap such that the steam chamber is heated outwardly by direct conduction of heat from the combustion chamber as well as inwardly by conduction of heat from the steam chest.

2. The combination internal combustion and steam engine of claim 1, wherein the at least one steam inlet valve comprises a bump valve in the cylinder cap and a valve lifter is mounted upon the inside of the piston in a position to engage and thereby open the bump valve responsive to piston movement for admitting steam into the steam chamber from the steam chest.

3. The combination internal combustion and steam engine of claim 1, wherein the at least one steam inlet valve is a single seated or double seated poppet valve having a normally closed circular valve member that is yieldably biased onto a valve seat communicating with a steam inlet opening within the stationary circular cap.

4. The combination internal combustion and steam engine of claim 1, wherein the combination internal combustion and steam engine has at least one operation regulator selected from a steam displacement control, a steam throttle and an inlet valve with variable cutoff and a controller is connected to the combination internal combustion and steam engine for adjusting at least one of the regulators to improve steam engine efficiency responsive to changes in one or more engine operating variables.

5. The combination internal combustion and steam engine of claim 1, wherein the combination internal combustion and steam engine is connected to an engine controller that regulates a steam engine throttle, a steam displacement control, or a variable steam inlet valve cutoff in response to changes in one or more engine operating variables selected from at least one of:
   a) a temperature and a pressure of the steam supplied to the engine,
   b) the output of a boiler or superheater that provides steam to the engine,
   c) engine loading and
   d) engine r.p.m, to thereby improve operating efficiency of the engine.

6. The combination internal combustion and steam engine of claim 1, wherein the combination internal combustion and steam engine is a multicylinder engine, the at least one steam inlet valve is connected between a steam supply and at least one of the cylinders such that opening of the at least one steam inlet valve is used to increase engine displacement when there is an increase in boiler output or heat supplied to the boiler and the at least one steam inlet valve is closed when there is a decrease in boiler output or heat supplied to the boiler for improving engine operating efficiency.

7. The combination internal combustion and steam engine of claim 1, wherein steam is exhausted through a steam exhaust port when an exhaust opening in the piston comes into alignment with said steam exhaust port.

8. A combination internal combustion and steam engine to maximize work output wherein internal combustion heat generates steam to assist in a piston movement, said engine comprising:
   at least one cylinder having a piston that is operatively connected to a crankshaft and is mounted for reciprocation therein between two energy conversion sources comprising an internal combustion chamber and a steam expansion chamber that are in the cylinder at opposing ends of the piston such that combustion pressure and steam pressure act upon the opposing ends of the piston to impart movement thereto during operation,
   at least one steam exhaust port being positioned in a sidewall of the cylinder to communicate with the steam chamber through the sidewall of the cylinder for exhausting steam therein through the cylinder sidewall at a location in the cylinder sidewall that is adjacent to a stationary cylinder cap located at one end of the steam expansion chamber, wherein the stationary cylinder cap has a cylindrical collar portion supporting piston engaging compression rings, wherein the stationary cylinder cap is located within the cylinder between opposing ends of the cylinder and between the at least one steam exhaust port and the crankshaft, wherein the stationary cylinder cap is spaced concentrically within an inside wall of the cylinder to accommodate the piston therebetween, and a steam inlet valve communicating through the stationary cylinder cap to control the injection of steam entering the steam chamber from a boiler or superheater fired by waste combustion heat that is produced in the combustion chamber.

9. The combination internal combustion and steam engine of claim 8, wherein the stationary cylinder cap is heated so as to heat an end of the expansion chamber located between the ends of the cylinder by being steam jacketed from at least a part of the stationary cylinder cap enclosed inside the piston.

10. The combination internal combustion and steam engine of claim 8, wherein the piston has at least one opening therethrough that allows steam to be exhausted from the steam expansion chamber located inside of the piston such that during an exhaust step, steam sweeps across a surface of the stationary cylinder cap that is a wall of the steam expansion chamber then through the at least one steam exhaust port when the opening in the piston comes into alignment with the at least one steam exhaust port in the cylinder.

11. The combination internal combustion and steam engine of claim 10, wherein the stationary cylinder cap is separated from the cylinder by an annular space and the piston has a skirt area located below the opening in the piston, the skirt area of the piston extends through the annular space and the skirt area of the piston is sealingly and slideably engaged with the collar portion at an outer edge of the stationary cylinder cap when the opening in the piston is in alignment with the port in the cylinder.

12. The combination internal combustion and steam engine of claim 8, wherein the stationary cylinder cap is a surface of a cylinder head comprising a disk that is sealingly engaged with an inner wall of the piston and the steam inlet valve is a poppet valve having a valve head proximate the disk for enabling steam to flow into the steam chamber through the disk.

13. The combination internal combustion and steam engine of claim 8, wherein the at least one steam exhaust port is opened and closed when the steam chamber is in an expanded state causing residual steam remaining therein to be thereafter recompressed prior to an admission of steam into the steam chamber through the steam inlet valve, and wherein the steam inlet valve communicates between the steam chamber and a steam supply passage within an inward part of the cylinder which encloses the piston at bottom dead center.

14. The combination internal combustion and steam engine of claim 8, wherein the boiler comprises a superheater that is connected to receive internal combustion exhaust gas for continued combustion therein of unburned gas and particulate material contained in the exhaust gas, wherein the combination internal combustion and steam engine further comprises:

a duct to carry steam in heat exchange relationship with the exhaust gas and with combustion products that are formed in the superheater, and a passage to convey the steam from the duct to the inlet valve for injecting steam into the steam chamber.

15. The combination internal combustion and steam engine of claim 14 further comprising an air duct for supplying air into the superheater to promote combustion of exhaust gas therein for transferring additional heat to the steam and for reducing air quality pollutants, and the superheater being connected to at least one internal combustion exhaust port of the engine to feed the exhaust gas thereto.

16. The combination internal combustion and steam engine of claim 14, wherein at least one blade is mounted in the superheater within a stream of exhaust gas for promoting a swirling movement of the exhaust gas therein to enhance combustion of unburned exhaust constituents.

17. The combination internal combustion and steam engine of claim 14, wherein the engine is a multi-cylinder engine, wherein the superheater has a plurality of inlet pipes each connected to an internal combustion engine exhaust port for transferring exhaust gases into the superheater such that the superheater comprises an internal combustion exhaust manifold, wherein a source of air is connected to the superheater to promote continued combustion of exhaust gases therein, and wherein a steam passage is provided for conveying steam in heat-exchange relationship with the exhaust gases that pass through the superheater and the passage conveys the steam to the cylinders of the engine.

18. The combination internal combustion and steam engine of claim 17, wherein said source of air is fed into the combustion exhaust gases that pass through the inlet pipes at a point between the superheater and the cylinders for allowing continued exhaust gas combustion upstream of the steam passage, and wherein a plurality of pitched blades are provided in the superheater for promoting mixing of air with the exhaust gases to facilitate combustion thereof in the superheater thereby increasing the enthalpy of steam conveyed through said passage.

19. The combination internal combustion and steam engine of claim 8, wherein the engine is a multicylinder engine with at least one compounding valve between an exhaust opening of one cylinder and a steam inlet opening of one or more of the other cylinders for feeding exhaust steam from said one cylinder to at least one other cylinder to achieve compounding through the operation of one or more such compounding valve.

20. The combination internal combustion and steam engine of claim 8, further including an oil stripper ring on the piston for carrying oil and combustion products to a circumferential collection channel in the inner wall of the cylinder to capture and remove oil and combustion products before entering a steam line.

21. The combination internal combustion and steam engine of claim 8, including at least one stripper ring supported in a circumferential inwardly opening groove within an inner wall of the cylinder to capture and remove oil and combustion products from the cylinder through a duct communicating with the groove before entering a steam line.

22. The combination internal combustion and steam engine of claim 8, wherein the boiler comprises a steam superheater connected as a part of an internal combustion exhaust manifold to receive exhaust gas from the combustion chamber, and further comprising:
- a duct for transferring steam in heat conductive relationship therethrough for heating the steam to be supplied to the inlet valve and
- a source of air being connected to the superheater for promoting the combustion of exhaust gas constituents therein.

23. The combination internal combustion and steam engine of claim 8, further including an auxiliary displacement chamber within the engine that communicates with the steam chamber through a throttling duct of selected diameter to provide a greater effective clearance volume at lower r.p.m.s and a reduced effective clearance volume at higher r.p.m.s.

24. The combination internal combustion and steam engine of claim 8, wherein a separate steam inlet valve communicates with each cylinder so as to allow the separate steam inlet valves to be opened sequentially to enable steam to flow through a progressively greater number of cylinders as boiler or superheater output increases or through progressively fewer cylinders as boiler or superheater output falls.

25. The combination internal combustion and steam engine of claim 8 including at least one engine regulator selected from a steam displacement control, a steam throttle and a variable cutoff of the steam inlet valve and
- wherein said regulator is managed by an engine controller which receives input from at least one engine operating variable for adjusting at least one of the regulators to improve fuel consumption of the engine.

26. A combination internal combustion and steam engine of claim 8,
- wherein the piston has at least one steam exhaust port therein,
- wherein an annular combustion gas collection channel extends circumferentially of the cylinder and is spaced from a steam exhaust manifold that encircles the cylinder,
- wherein the combustion gas collection channel communicates with the interior of the cylinder and is positioned on the opposite side of both the steam exhaust manifold and the piston exhaust port from an engine crankshaft to recover and remove combustion products and blow-by combustion gases before entering a steam line, and
- wherein an outlet passage is connected to the channel to carry away the combustion products.

27. A combination internal combustion and steam engine comprising,
- at least one cylinder one end of which is connected to a crankcase and having a combustion chamber at the other end with combustion inlet and exhaust ports and a source of combustible fuel connected thereto,
- a skirted piston sealingly and slideably mounted within the cylinder between the combustion chamber and a steam expansion chamber,
- a piston rod substantially centered within the piston which is connected to the piston at one end and having a crosshead at the other end thereof,
- a connecting rod secured between the crosshead and a crankshaft,
- a steam cylinder head inward of the piston and the combustion chamber that is sealingly and slideably engaged with the piston rod and with an inner surface of the skirt of the piston and comprising a stationary cap on one end of a supporting column that has another end supported by the crankcase, said crosshead being slideably mounted within said column,
- wherein the connecting rod is located to move through the cylinder between the steam cylinder head and the crankshaft,
- wherein the stationary cap and the supporting column define an upper surface and a central surface of a chamber that is enclosed within the cylinder adjacent the cap,
- a steam inlet valve in the stationary cap supplying a source of steam produced by waste heat from the combustion chamber, and
- a steam exhaust valve within the engine that communicates with the steam expansion chamber.

28. A combination internal combustion and steam engine wherein steam is generated by waste heat resulting from the internal combustion, said engine comprising,
- at least one cylinder with a piston that is operatively connected to a crankshaft by at least one rod and the piston is mounted for reciprocation in the cylinder between a combustion chamber and a steam chamber each within the cylinder such that the piston is powered by internal combustion and by steam at opposing ends thereof,
- wherein the steam chamber is located between the piston and a stationary steam cylinder head at one end of the steam chamber such that the stationary cylinder head forms a seal at an inward end of the steam chamber,
- wherein the cylinder has a space therein located inwardly of the steam chamber between the steam cylinder head and the crankshaft,
- wherein the steam cylinder head has a cylindrical portion at an outward end of the space within the cylinder,
- wherein the seal comprises piston-engaging compression rings supported on the cylindrical portion of the steam cylinder head,
- wherein the at least one rod is located to move during operation through the space within the cylinder and between the steam cylinder head and the crankshaft,
- wherein a support structure located between the cylinder and the rod extends inwardly from the steam cylinder head to an inward end of the cylinder,
- a steam inlet valve in the engine for admitting steam into the steam chamber,
- wherein the steam inlet valve has a steam inlet valve lifter that is located within the piston to operate in timed relationship with the reciprocation of the piston for opening the steam inlet valve,
- a steam exhaust valve of the steam chamber operating in timed relationship with the reciprocation of the piston,
- wherein the steam exhaust valve opens and closes a steam exhaust port, said exhaust valve opening when the steam chamber is in an expanded state to thereby exhaust steam from the steam chamber while the steam chamber is expanded whereupon continued piston movement reduces a volume of the steam chamber, and
- wherein the steam inlet valve admits steam into any residual steam remaining in the steam chamber.

29. The combination internal combustion and steam engine of claim 28, wherein the steam cylinder head is a cylinder cap sealingly engaged with an inner wall of the piston by the compression rings and supported upon a free end of the support structure that extends through said space in an inward portion of the cylinder.

30. The combination internal combustion and steam engine of claim 28, including operation regulators comprising a steam throttle and the steam inlet valve and a steam cutoff control is operatively associated with the steam inlet valve,
- whereby at least one of the operation regulators is used to permit enhancement of engine efficiency when there is a change in at least one engine operating variable.

31. The combination internal combustion and steam engine of claim 30 wherein a controller comprising an engine management computer is connected to control at least one of the operation regulators comprising the steam engine throttle and the steam inlet valve cutoff in response to changes in at least one engine operating variable selected from a steam supply temperature, a steam supply pressure, boiler or superheater output, engine loading and engine r.p.m. for improving engine operating efficiency.

32. The combination internal combustion and steam engine of claim 28, wherein the engine is a multicylinder engine and at least one valve is connected between the steam boiler or superheater and at least one of the cylinders for providing steam to different selected numbers of cylinders to thereby maintain a more constant ratio between boiler or superheater output and steam cylinder displacement.

33. The combination internal combustion and steam engine of claim 28 wherein the engine is a multicylinder engine with steam valving communicatively connected to at least one of the cylinders to selectively control the flow of steam to different numbers of the cylinders to thereby change the operating steam displacement of the engine.

34. The combination internal combustion and steam engine of claim 28, wherein when the combination internal combustion and steam engine is installed in a vehicle, the steam chamber is connected to a storage tank,
wherein, during a braking mode, compressed air is supplied and stored in the storage tank for storing energy, and
wherein, during a moving mode of the vehicle, the compressed air in the storage tank is supplied to the steam chamber.

35. The combination internal combustion and steam engine of claim 28, wherein the steam cylinder head is a disk with a periphery that is sealingly engaged with the piston, the steam inlet valve is positioned within the disk for sealing a steam admission opening extending through the disk and the steam is exhausted through a port located in a sidewall of the cylinder and positioned between the disk and the combustion chamber.

36. The combination internal combustion and steam engine of claim 28 wherein steam is admitted to the steam chamber from a steam throttle,
wherein the steam inlet valve has a variable steam cutoff, and
wherein the cutoff of steam flow through the inlet valve and the steam throttle are regulated by a controller receiving input from at least one of an engine operating variable and a driver's throttle control for adjustment of at least the steam cutoff to optimize fuel consumption by the engine.

37. The combination internal combustion and steam engine of claim 28, further including:
a heat exchanger,
a condenser,
a passage for transferring exhaust steam from the engine through the heat exchanger and thereafter to the condenser to produce a condensate,
a cooling jacket to cool the combustion chamber by transferring heat therefrom to heat the condensate, and
a passage to transfer the condensate into the heat exchanger in heat exchange relationship with the exhaust steam and thereafter through a boiler or superheater to provide steam for powering the engine in a closed circuit.

38. The combination internal combustion and steam engine of claim 37, wherein a passage is provided for transferring steam from the superheater to the engine, the superheater is fired by internal combustion heat and wherein combustion of exhaust gases from the combustion chamber is continued by air supplied through a duct to the superheater.

39. The combination internal combustion and steam engine of claim 37, further including an additional heat exchanger and an engine coolant that is provided within the cooling jacket is passed through the additional heat exchanger in heat exchange relationship with the condensate to transfer said combustion chamber heat to heat the condensate.

40. The combination internal combustion and steam engine of claim 28, wherein the steam cylinder head has a peripheral collar portion slideably and sealingly engaged with the piston, and
wherein the steam exhaust valve is at least one exhaust port in the skirt of the piston which is spaced from an edge of the piston by a skirt portion of the piston that overlaps the collar when the piston is at top center position.

41. The combination internal combustion and steam engine of claim 28,
wherein following said closing of said steam exhaust port, said residual steam is compressed as a continued piston movement reduces the volume of the steam chamber.

42. The combination internal combustion and steam engine of claim 28,
wherein the steam inlet valve lifter is a lifter rod that is operatively connected thereto for moving the steam valve inwardly to thereby open said valve.

43. The combination internal combustion and steam engine of claim 28,
wherein the steam inlet valve lifter is a lifter element operatively associated with the steam inlet valve and an inward side of the piston in a position to bump the steam inlet valve inwardly to thereby open said steam inlet valve.

* * * * *